(12) United States Patent
Drexler et al.

(10) Patent No.: US 12,732,076 B2
(45) Date of Patent: Sep. 8, 2026

(54) ELECTRIC MOTOR

(71) Applicant: Electric Torque Machines, Inc., Minneapolis, MN (US)

(72) Inventors: Jarrod C. Drexler, Monticello, MN (US); Douglas S. Ryder, Buffalo, MN (US); Tyler K. Williams, Flagstaff, AZ (US)

(73) Assignee: Electric Torque Machines, Minneapolis, MN (US)

( * ) Notice: Subject to any disclaimer, the term of this patent is extended or adjusted under 35 U.S.C. 154(b) by 258 days.

(21) Appl. No.: 18/696,862

(22) PCT Filed: Sep. 26, 2022

(86) PCT No.: PCT/US2022/044729
§ 371 (c)(1),
(2) Date: Mar. 28, 2024

(87) PCT Pub. No.: WO2023/055690
PCT Pub. Date: Apr. 6, 2023

(65) Prior Publication Data

US 2025/0023435 A1 Jan. 16, 2025

Related U.S. Application Data

(60) Provisional application No. 63/249,688, filed on Sep. 29, 2021.

(51) Int. Cl.
*H02K 21/22* (2006.01)

(52) U.S. Cl.
CPC ....... *H02K 21/227* (2013.01); *H02K 2201/12* (2013.01)

(58) Field of Classification Search
CPC ............. H02K 21/227; H02K 2201/12; H02K 2203/09; H02K 3/525
See application file for complete search history.

(56) References Cited

U.S. PATENT DOCUMENTS 2,243,318 A 5/1941 William
5,306,183 A 4/1994 Holt et al.
(Continued)

FOREIGN PATENT DOCUMENTS

DE 29500878 U1 10/1995
DE 102010018145 A1 10/2011
(Continued)

OTHER PUBLICATIONS

International Search Report and Written Opinion for PCT Application No. PCT/US2022/044729, Dated Apr. 12, 2023, pp. 22.
(Continued)

*Primary Examiner* — Tulsidas C Patel
*Assistant Examiner* — Mohammed Ahmed Qureshi
(74) *Attorney, Agent, or Firm* — Kinney & Lange, P.A.

(57) ABSTRACT

An electric motor includes a rotor and a stator that includes a plurality of coils arrayed along a rotational axis of the rotor. The rotor is potted with potting compound. The stator is potted with potting compound. Each coil of the stator is electrically connected to a power source to receive operating power from the power source. The coils are powered to cause the stator to electromagnetically drive rotation of the rotor on the rotational axis.

19 Claims, 23 Drawing Sheets

(56) References Cited

U.S. PATENT DOCUMENTS

| | | | |
|---|---|---|---|
| 6,924,579 B2 | 8/2005 | Calley | |
| 7,626,308 B2 | 12/2009 | Kang et al. | |
| 7,876,019 B2 | 1/2011 | Calley | |
| 8,159,099 B2 * | 4/2012 | Dumpert | H02K 3/12 310/71 |
| 8,242,658 B2 | 8/2012 | Calley et al. | |
| 8,395,291 B2 | 3/2013 | Calley et al. | |
| 8,405,275 B2 | 3/2013 | Calley et al. | |
| 8,415,848 B2 | 4/2013 | Calley et al. | |
| 8,749,108 B2 | 6/2014 | Dyer et al. | |
| 8,760,023 B2 | 6/2014 | Calley et al. | |
| 8,854,171 B2 | 10/2014 | Janecek | |
| 8,952,590 B2 | 2/2015 | Calley et al. | |
| 8,970,205 B2 | 3/2015 | Janecek et al. | |
| 8,994,243 B2 | 3/2015 | Calley et al. | |
| 9,006,951 B2 | 4/2015 | Janecek et al. | |
| 9,236,773 B2 | 1/2016 | Janecek et al. | |
| 9,325,212 B2 * | 4/2016 | Tangudi | H02K 1/27 |
| 9,360,020 B2 | 6/2016 | Janecek | |
| 9,509,181 B2 | 11/2016 | Janecek et al. | |
| 9,618,003 B2 | 4/2017 | Janecek et al. | |
| 9,749,108 B2 | 8/2017 | Hoshino et al. | |
| 11,646,635 B2 | 5/2023 | Janecek et al. | |
| 2002/0074891 A1 | 6/2002 | Gieras et al. | |
| 2004/0046478 A1 | 3/2004 | Zierer et al. | |
| 2005/0012427 A1 | 1/2005 | Seki et al. | |
| 2009/0206696 A1 | 8/2009 | Calley | |
| 2011/0221298 A1 | 9/2011 | Calley et al. | |
| 2012/0119599 A1 | 5/2012 | Calley et al. | |
| 2012/0119609 A1 | 5/2012 | Janecek | |
| 2012/0234108 A1 | 9/2012 | Janecek et al. | |
| 2012/0235519 A1 | 9/2012 | Dyer et al. | |
| 2013/0002068 A1 | 1/2013 | Miyasaka et al. | |
| 2013/0015733 A1 | 1/2013 | Rasch et al. | |
| 2015/0048712 A1 | 2/2015 | Janecek et al. | |
| 2015/0147188 A1 | 5/2015 | Danielsson | |
| 2017/0113773 A1 | 4/2017 | Kaiser et al. | |
| 2020/0031445 A1 | 1/2020 | Wei | |
| 2020/0083762 A1 | 3/2020 | Nitta et al. | |
| 2023/0058117 A1 | 2/2023 | Williams et al. | |

FOREIGN PATENT DOCUMENTS

| | | | |
|---|---|---|---|
| DE | 102011084296 | A1 | 4/2013 |
| DE | 112014006362 | T5 | 11/2016 |
| EP | 1063754 | A2 | 12/2000 |
| EP | 1587207 | A1 | 10/2005 |
| EP | 2006977 | A2 | 12/2008 |
| EP | 2159903 | A2 | 3/2010 |
| EP | 2594477 | A1 | 5/2013 |
| EP | 2686939 | A2 | 1/2014 |
| EP | 3082231 | A1 | 10/2016 |
| GB | 2491880 | A | 12/2012 |
| JP | 2009005420 | A | 1/2009 |
| WO | 2010064368 | A1 | 6/2010 |
| WO | 2012125790 | A2 | 9/2012 |
| WO | 2015089518 | A1 | 6/2015 |
| WO | 2015163871 | A1 | 10/2015 |
| WO | 2021163156 | A1 | 8/2021 |
| WO | 2022035940 | A1 | 2/2022 |
| WO | 2022066616 | A2 | 3/2022 |
| WO | 2022165015 | A1 | 8/2022 |
| WO | 2023043904 | A1 | 3/2023 |
| WO | 2023055690 | A2 | 4/2023 |
| WO | 2023114290 | A1 | 6/2023 |

OTHER PUBLICATIONS

Invitation to Pay Additional Fees for PCT Application No. PCT/US2022/044729, Dated Feb. 17, 2023, pp. 16.

International Preliminary Report on Patentability for PCT Application No. PCT/US2022/044729, Dated Apr. 11, 2024, pp. 14.

* cited by examiner 92
130
82
94
114
68a
70
34
90
132
108
114
104
68b
112
68c
124
84
110
66c
120
66b
66a
106

ELECTRIC MOTOR

CROSS-REFERENCE TO RELATED APPLICATION(S)

This application claims the benefit of U.S. Provisional Application No. 63/249,688 filed Sep. 29, 2021 and entitled "ELECTRIC MOTOR HAVING POTTING FEATURES," the disclosure of which is hereby incorporated by reference in its entirety.

BACKGROUND

The present disclosure relates generally to electric machines. The main type of electric machine presented herein is a transverse flux motor, which is distinguished from axial or radial flux type electric motors. However, the inventive aspects discussed herein can be applied to various types of motors beyond just transverse flux motors.

Electric motors utilize electricity to generate a mechanical output. Some electric motors generate rotational outputs. A stator of the motor is electrically energized to electromagnetically drive rotation of a rotor about an axis. The stator includes laminates and windings. The rotor includes permanent magnets that are acted on by the electromagnetic field that is induced by current through the stator to cause rotation of the rotor relative to the stator.

SUMMARY

According to an aspect of the disclosure, an electric motor includes a rotor configured to rotate on an axis to generate a mechanical output, the rotor comprising a rotor body and a permanent magnet array; a stator spaced radially relative to the rotor and disposed about the rotational axis, the stator comprising a plurality of coils arrayed along the axis; and a stator bar extending along the axis and including a plurality of terminals, the stator bar electrically connecting the plurality of coils with the plurality of terminals.

According to an additional or alternative aspect of the disclosure, an electric motor includes a rotor configured to rotate on an axis to generate a mechanical output, the rotor comprising a rotor body and a permanent magnet array; stator spaced radially relative to the rotor and disposed about the rotational axis, the stator comprising a plurality of coils arrayed along the axis; and a stator bar extending along the axis. The stator bar includes a plurality of terminals extending from a first axial end of the stator bar; a plurality of tabs disposed on a radial side of the stator bar and spaced axially along the radial side of the stator bar, wherein each tab of the plurality of tabs contacts a wire end of a single coil of the plurality of coils; and a panel disposed on the radial side of the stator bar and electrically connected to each coil of the plurality of coils.

According to another additional or alternative aspect of the disclosure, an electric motor includes a rotor configured to rotate on an axis to generate a mechanical output, the rotor comprising a rotor body and a permanent magnet array; a stator spaced radially relative to the rotor and disposed about the rotational axis, the stator comprising a plurality of coils arrayed along the axis; and a support assembly disposed within the stator. The support assembly includes an axle radially within the stator; and a stator bar disposed within the axle, the stator bar including a plurality of terminals extending from a first axial end of the stator bar, the stator bar electrically connecting the plurality of coils with the plurality of terminals. Wire ends of the plurality of coils extend through a wire slot formed in the axle to contact the stator bar.

According to yet another additional or alternative aspect of the disclosure, an electric motor includes a rotor configured to rotate on an axis to generate a mechanical output, the rotor comprising a rotor body and a permanent magnet array; a stator spaced radially relative to the rotor and disposed about the rotational axis, the stator comprising a plurality of coils arrayed along the axis; and a stator bar disposed within the axle, the stator bar including a stator fill channel extending through the stator bar between an inlet port and an outlet port. Potting compound that embeds the stator at least partially fills the stator fill channel.

According to yet another additional or alternative aspect of the disclosure, a stator bar configured to provide electrical connections for coils of a stator of an electric motor, the stator including a bar body extending along a body axis between a first axial end and a second axial end; a plurality of terminals extending from the first axial end; a plurality of tabs disposed on a radial side of the bar body; a panel disposed on the radial side of the bar body; and a plurality of traces extending through the bar body between the plurality of tabs and the plurality of terminals, wherein each trace of the plurality of traces extends between a single terminal of the plurality of terminals and a single tab of the plurality of tabs.

According to yet another additional or alternative aspect of the disclosure, a method of assembling a stator of an electric motor includes aligning a stator bar with a first phase assembly on an axis, the stator bar including a plurality of terminals extending from a first axial end of a bar body of the stator bar, the first phase assembly including a first pair of flux rings bracketing a first coil; and shifting one of the stator bar and the first phase assembly axially relative to the other one of the stator bar and the first phase assembly such that the stator bar passes through a central opening of the first phase assembly and such that a wire ends of the first coil pass into contact with a first tab of the stator bar and a panel of the stator bar.

According to yet another additional or alternative aspect of the disclosure, a method of potting a stator of an electric motor, the stator including a plurality of phase assemblies arrayed along an axis, an axle disposed radially within the stator, and a stator bar disposed radially within the axle, the method including orienting the stator such that the axis is oriented vertically; flowing liquid potting compound through a stator fill channel that extends axially through the stator bar; and flowing the liquid potting compound out of the stator bar through an outlet port extending through a radial side of the stator bar.

According to yet another additional or alternative aspect of the disclosure, an electric motor includes a rotor configured to rotate on a rotor axis to generate a mechanical output, the rotor comprising a rotor body and a permanent magnet array and a stator spaced radially relative to the rotor and disposed about the rotational axis. The rotor body includes a rotor housing having a first axial end and a second axial end; a fill port formed at the second axial end; a rotor fill channel extending axially within the rotor housing from the fill port; and a discharge port in fluid communication with the rotor fill channel and oriented radially, the discharge port open on a surface of the rotor housing supporting the permanent magnet array.

According to yet another additional or alternative aspect of the disclosure, an electric motor includes a rotor that rotates about an axis, the rotor including a rotor housing having a fill port on a top end of the rotor housing, a fill channel that extends axially from the fill port, and a discharge port that extends radially inward towards the axis from the fill channel; and a stator that includes a plurality of coils.

According to yet another additional or alternative aspect of the disclosure, a rotor for an electric motor, the rotor configured to rotate on a rotational axis, the rotor including a rotor housing extending between a first axial end and a second axial end; a fill port formed at the second axial end; a rotor fill channel extending axially within the rotor housing from the fill port; a discharge port in fluid communication with the rotor fill channel and open on an interior surface of the rotor housing; and a permanent magnet array disposed about the interior surface, wherein the permanent magnet array is bonded to the interior surface by a matrix of potting compound that is also disposed in the rotor fill channel.

According to yet another additional or alternative aspect of the disclosure, a method of potting a rotor of an electric motor, the rotor configured to rotate on a rotational axis, the method including orienting a rotor housing of the rotor such that a fill port formed in an axial end of the rotor is oriented vertically upwards; flowing liquid potting compound into a rotor fill channel through the fill port; and flowing the liquid potting compound out of the rotor fill channel and into an interior of the rotor housing through a discharge port that extends from the rotor fill channel and is open on a radially inner surface of the rotor housing, the liquid potting compound filling axially and vertically upwards within the interior of the rotor housing.

DETAILED DESCRIPTION

Figure 1A:
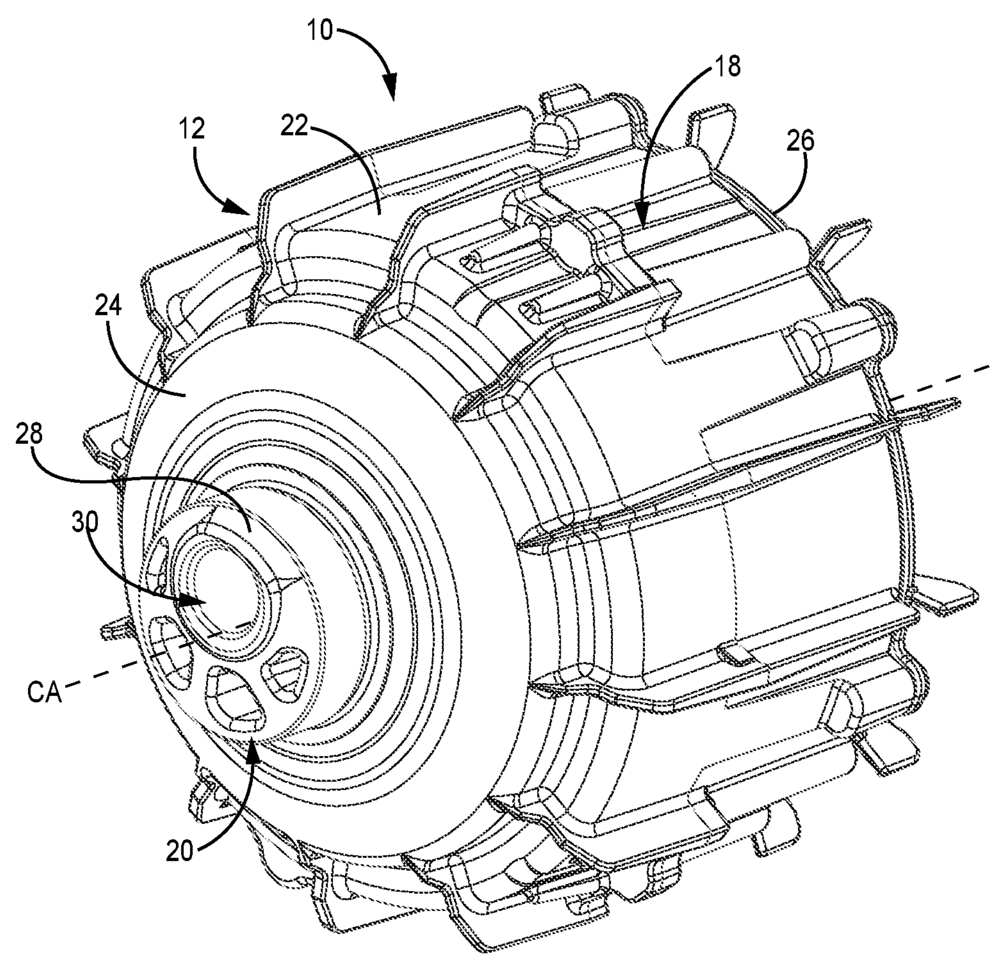
FIG. 1A is an isometric view of an electric motor.

The present disclosure concerns electric motors. The main type of motor presented herein is a transverse flux motor, which is distinguished from axial or radial flux type electric motors. However, the inventive aspects discussed herein can be applied to various types of motors beyond just transverse flux motors. It is understood that, while the electric machine is generally discussed as being an electric motor, the principles discussed herein are applicable to other electric machines, such as generators.

The electric machines of this disclosure include a rotor rotatable about a rotational axis and a stator configured to drive rotation of the rotor. According to aspects of the disclosure, the stator of the transverse flux electric motor includes stator phases, such as one, two, three, or more, formed from flux rings and a coil disposed axially between opposing ones of the flux rings. The flux rings can include spurs that extend radially relative to the motor axis and towards the rotor.

According to aspects of the disclosure, the stator is supported on a stator support assembly. The stator support assembly can include an axle that supports the stator relative to the rotor. Bearings that the rotor can be supported on the axle. A stator bar provides electrical interface locations for the stator to operatively connect, communicatively and/or electrically, to a control module of the motor. The bus bar can be disposed coaxially with the rotational axis and can be configured to make mechanical and electrical connections with the stator. The stator bar can electrically connect with each phase of the stator by inserting the stator bar into the stator phases.

According to aspects of the disclosure, a stator bar makes electrical connections with one or more, up to all, of the phases of the stator. The electrical connections can be formed simultaneously by inserting the stator bar into the stator. The stator bar can be inserted along an axis of the motor such that the stator bar is disposed coaxially with the stator. The electrical terminals of the stator bar that connect with the coils of the stator can be arrayed along a single side of the stator bar. The electrical terminals that facilitate connections with a control module or other power source can be disposed on an end of the stator bar.

According to aspects of the disclosure, the stator bar can facilitate making both electrical and data communications connections with a control module of the electric motor. The electrical connection location and the data communications connection location can be disposed on a same side of the stator bar. The electrical and data communications connection locations can be disposed on an axial end of the stator bar.

According to aspects of the disclosure, a data communications connector can be disposed on a circuit board assembly that is mounted to the stator bar. The circuit board assembly can be formed from multiple circuit boards assembled together. The circuit board assembly can extend axially within the stator bar. The circuit board assembly can include one or more sensor chips, such as an encoder chip, mounted on a circuit board of the circuit board assembly. The sensor chip can be disposed at an opposite axial end of the stator bar from the data communications connector.

Components of the stator are potted together with potting compound, which can be formed from an epoxy. According to aspects of the disclosure, a stator bar is disposed within the stator and directs liquid potting compound during the potting process. The stator bar, which can be referred to as a potting bar when directing potting compound, can also be formed as a bus bar that forms electrical and/or data communications connections for the motor. The potting bar includes an internal passage that guides the liquid potting compound to an interior of the stator and outputs the potting material within the stator. The potting bar outputs the potting material at an opposite end of the stator from the fill port of the potting bar. The potting bar outputs the potting material at a vertically lower location along the stator, which inhibits the formation of gas pockets and provides for more uniform potting matrix within the stator. The potting bar facilitates degassing as potting material is applied to the motor. Further, the potting bar can occupy space within the stator to reduce the space within stator that is occupied by potting compound, decreasing the weight and cost of the motor.

Components of the rotor are potted together with potting compound, which can be formed from an epoxy. According to aspects of the disclosure, the rotor housing includes one or more passages that route potting compound within the rotor during the potting process. The potting passage routes the potting compound to an outlet port from which the potting compound flows into the rotor to pot the rotor. The potting passage outputs the potting compound at a vertically lower portion of the rotor during the potting process. Flowing the potting compound through the potting passage facilitates degassing as the potting material is applied because the potting material is filling from the bottom upwards.

According to aspects of the disclosure, the rotor is configured to route the potting compound through a potting passage formed within the rotor housing and spaced radially from the interface between the rotor housing and the permanent magnets. The rotor can be configured to provide an eccentric output. The eccentric output is offset from the rotational axis of the rotor. The potting passage can be disposed on an opposite radial side of the rotational axis from the eccentric output. The potting material cures within the rotor and within the potting passage. The potting material within the passage balances with the offset eccentric output to rotationally balance the rotor.

Several of the figures of the disclosure show a common axis, which is sometimes referred to as a motor axis. An axis of rotation of the rotor is disposed coaxially with the common axis. The term annular is used herein, which can refer to a ring shape (continuous or broken) about the common axis, which can be coaxial with the common axis. The term radial is used herein which when referring to a direction is any direction away from the common axis, unless otherwise noted. The radial direction can be orthogonal to the common axis. The term axial is used herein which when referring to a direction is any direction along the common axis, unless otherwise noted. The axial direction can be parallel to the common axis. The terms circumferential or circumferentially as used herein means around the common axis, unless otherwise noted.

Components can be considered to radially overlap when those components are disposed at common axial locations along common axis CA. A radial line extending orthogonally from common axis CA will extend through each of the radially overlapping components. Components can be considered to axially overlap when those components are disposed at common radial and circumferential locations such that an axial line parallel to common axis CA extends through the axially overlapping components. Components can be considered to circumferentially overlap when aligned about common axis CA, such that a circle centered on common axis CA passes through the circumferentially overlapping components.

Figure 1B:
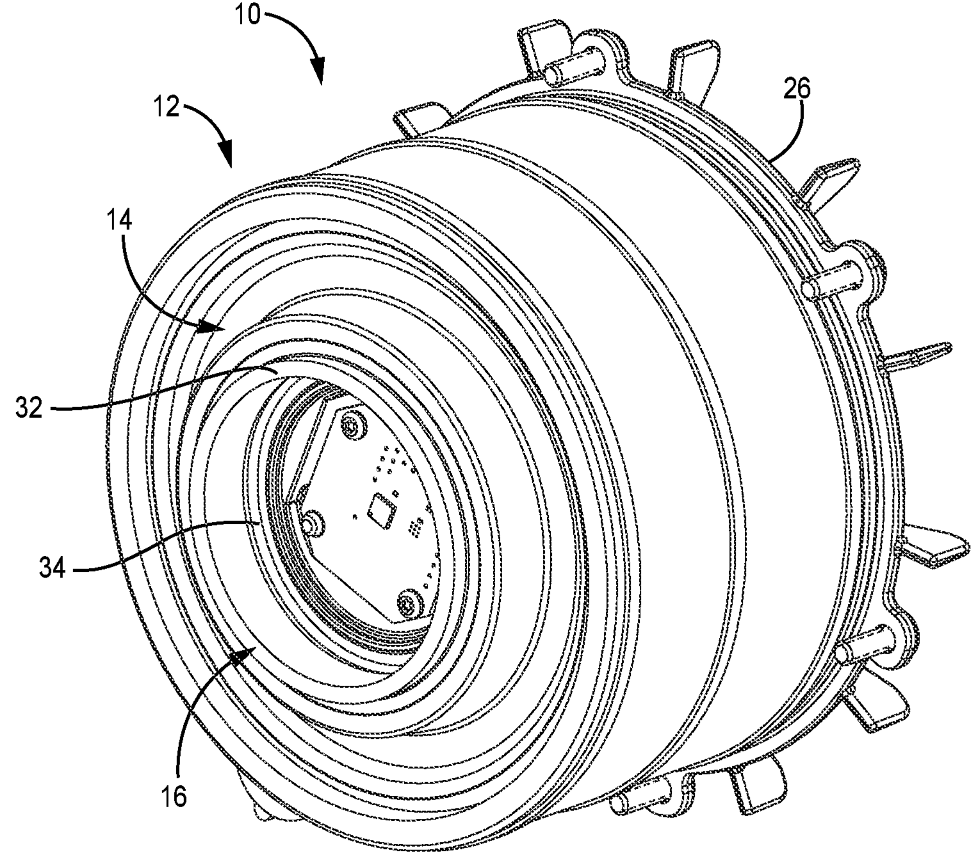
FIG. 1B is an isometric view of the electric motor shown in FIG. 1A with the rotor housing removed.

FIG. 1A is an isometric view of motor 10. FIG. 1B is an isometric view of motor 10 with rotor housing 22 removed. FIGS. 1A and 1B will be discussed together. Motor 10 includes rotor 12, stator 14, and support assembly 16. Rotor 12 includes rotor body 18 and eccentric output 20. Rotor body 18 includes rotor housing 22, first wall 24, and second wall 26. Eccentric output 20 includes cylindrical projection 28 and mount bore 30. Axle 32 and stator bar 34 of support assembly 16 are shown.

Motor 10 is an electric motor 10 configured to generate a mechanical output. Rotor 12 and stator 14 are disposed on a common axis CA. The common axis CA is coaxial with the rotational axis of the rotor 12 in the example shown. In the example shown, rotor 12 is disposed about the stator 14 such that motor 10 is configured as an outer rotator. It is understood, however, that other examples include rotor 12 disposed within the stator 14 such that motor 10 is configured as an inner rotator.

Rotor body 18 structurally supports other components of rotor 12. In the example shown, a permanent magnet array 36 (best seen in FIG. 3B) is supported on a radially inner side of rotor body 18. Specifically, the permanent magnet array 36 is supported on the radially inner side of rotor housing 22. Rotor housing 22 is a cylindrical body in the example shown. Rotor housing 22 extends axially between first wall 24 and second wall 26. In the example shown, first wall 24 is formed integrally with rotor housing 22. First wall 24 and rotor housing 22 can be formed as a monolithic structure. First wall 24 forms a closed end of rotor body 18. Second wall 26 is disposed at an opposite axial end of rotor 12 from first wall 24. In the example shown, second wall 26 is formed separately from and connected to rotor housing 22. For example, second wall 26 can be connected to rotor housing 22 by fasteners, such as bolts, among other options.

Eccentric output 20 extends axially from rotor body 18. Cylindrical projection 28 of eccentric output 20 extends such that common axis CA extends through cylindrical projection 28. Mount bore 30 extends into cylindrical projection 28. Mount bore 30 is configured to receive a connector to connect an eccentric driver, such as a crank arm, to rotor 12. For example, a bolt can extend into and mount within mount bore 30 and the crank arm can be supported on the bolt. Mount bore 30 is radially offset from common axis CA such that mount bore 30 rotates about the common axis CA offset from the common axis CA.

Support assembly 16 is at least partially disposed within stator 14. Support assembly 16 can support both the stator 14 and rotor 12. Specifically, axle 32 of support assembly 16 can structurally support stator 14 and rotor 12. For example, stator 14 can be connected to the support assembly 16, such as by potting compound, among other options. Support assembly 16 can extend axially out of stator 14 to connect to a stator support plate. The rotor bearings that rotationally support the rotor 12 can be disposed on and supported by support assembly 16. The bearings can be mounted on axle 32. Axle 32 can directly interface with the bearings supporting the rotor 12 and with the stator support.

Stator bar 34 is at least partially disposed within axle 32. In the example shown, stator bar 34 is configured as a bus bar that makes electrical connections between an external control module for the motor 10 and the coils within the stator 14 that generate the electromagnetic fields that interact with the rotor 12 to rotate the rotor 12. Stator 14 is configured to generate electromagnetic fields that magnetically interact with rotor 12 to rotate rotor 12 relative to stator 14. Specifically, an alternating current (AC) signal can be run through each coil of the stator 14. The AC signal rapidly builds and collapses the magnetic field due to the current reversal of the AC signal through the coils.

Figure 2A:
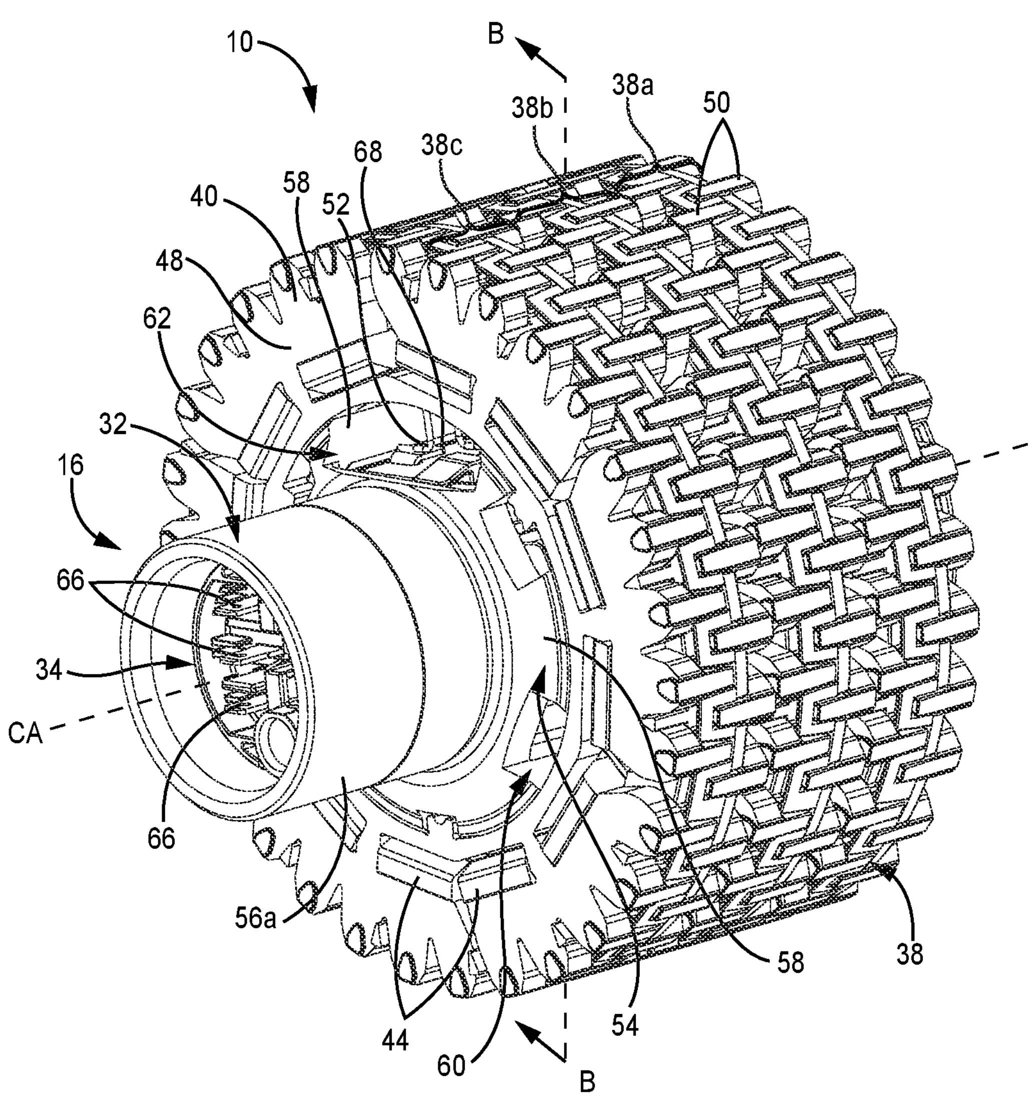
FIG. 2A is an isometric view of a stator.
Figure 2B:
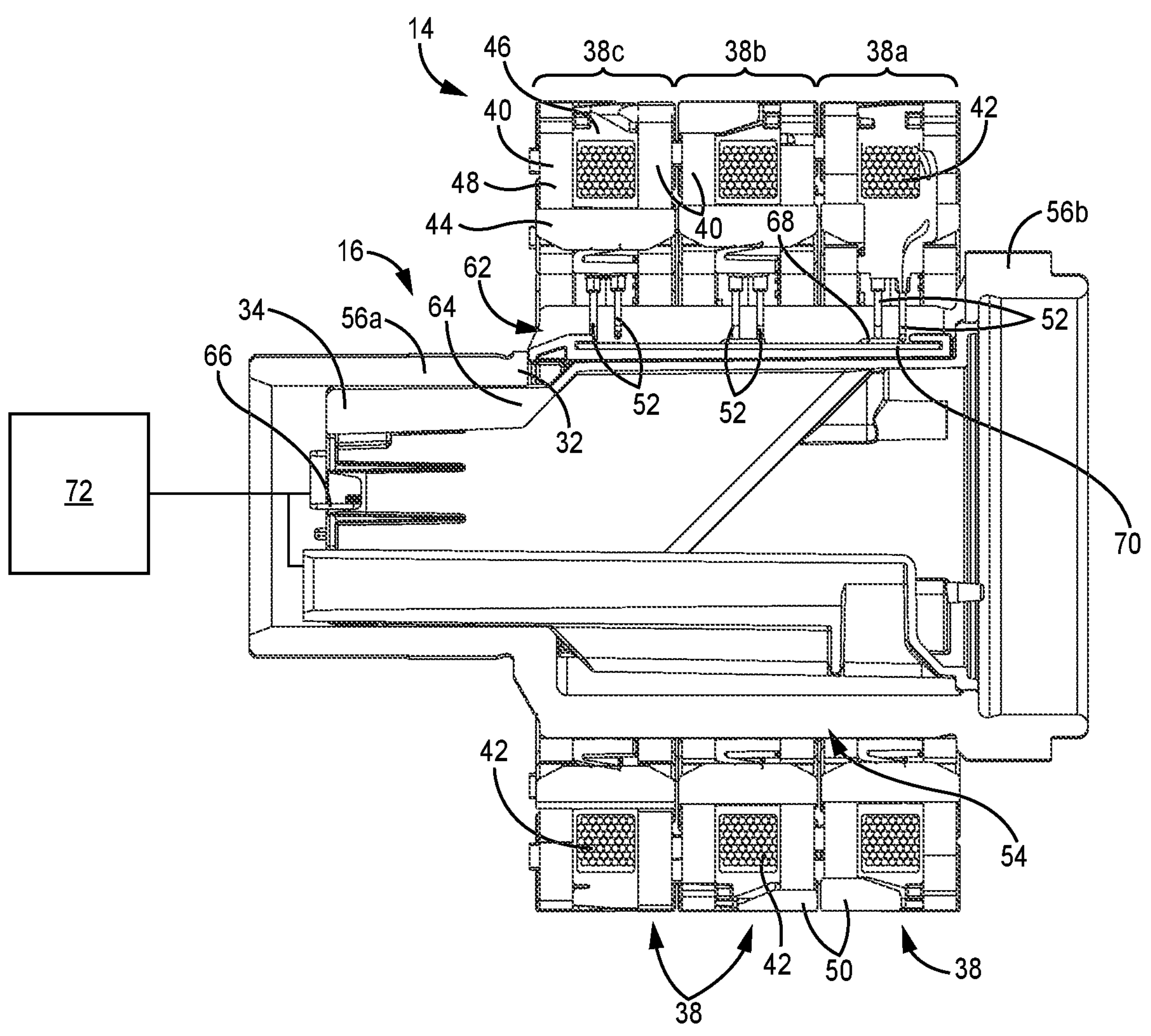
FIG. 2B is a planar cross-sectional view taken along line B-B in FIG. 2A.
Figure 2C:
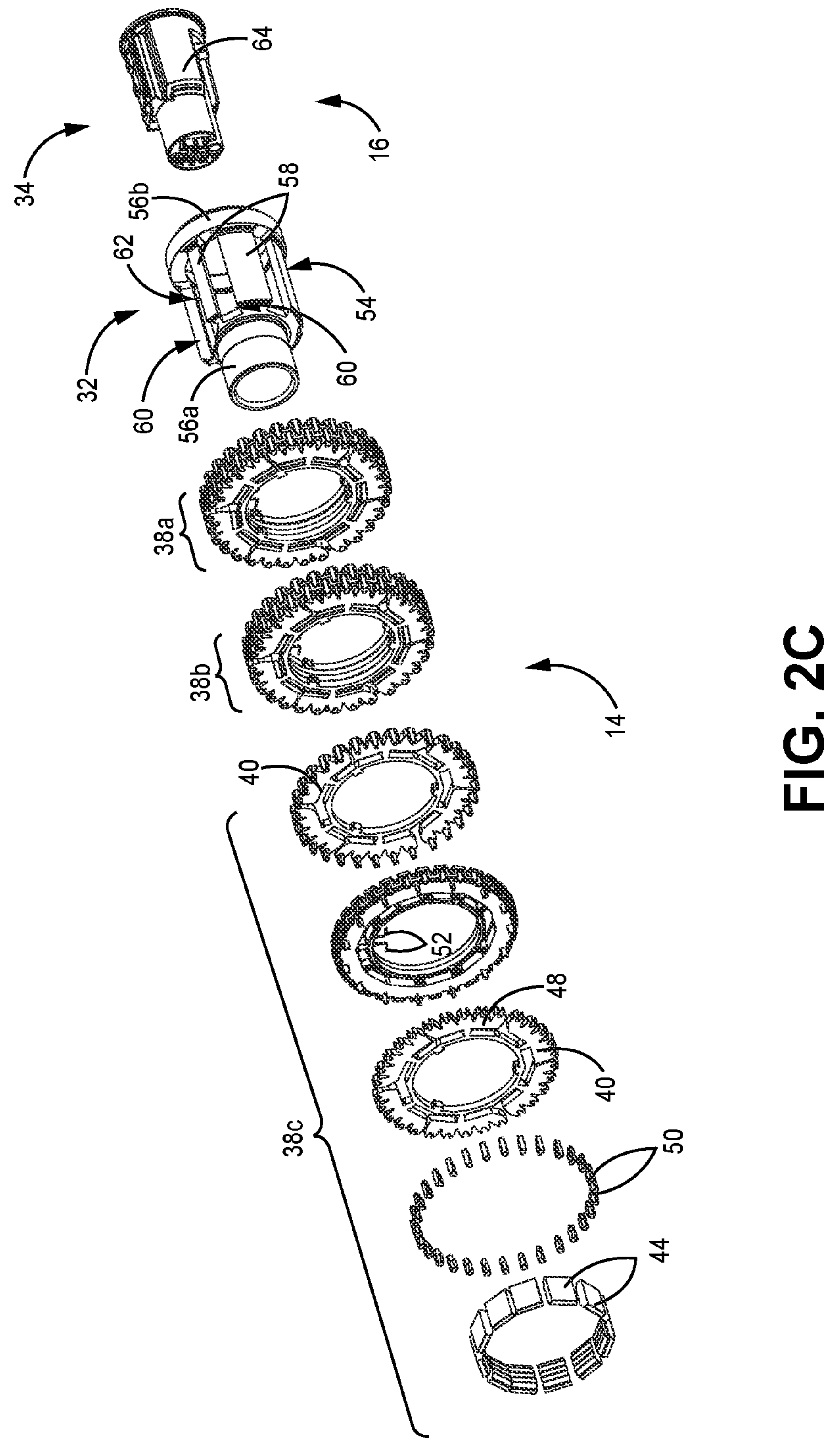
FIG. 2C is an exploded view showing a stator and a support assembly.

FIG. 2A is an isometric view of stator 14. FIG. 2B is a planar cross-sectional view taken along line B-B in FIG. 2A. FIG. 2C is an exploded view of stator 14 and support assembly 16, further showing phase assembly 38*c* exploded apart. FIGS. 2A-2C are discussed together. FIGS. 2A-2C show electromagnetic components of stator 14. Stator 14 includes phase assemblies 38*a*, 38*b*, 38*c* (collectively herein "phase assembly 38" or "phase assemblies 38"). Each phase assembly 38 includes a pair of flux rings 40, coil 42, axial returns 44, and bobbin 46 (shown in FIG. 3C for phase assembly 38*a*). In the example shown, each flux ring 40 includes ring body 48 and teeth 50. Each coil 42 includes wire ends 52. Support assembly 16 includes axle 32 and stator bar 34. Axle 32 includes axle body 54 and axle ends 56*a*, 56*b*. Axle body 54 includes ligaments 58 and windows 60. One of windows 60 forms wire slot 62. Stator bar 34 includes bar body 64, end terminals 66, and tabs 68.

Stator 14 includes the multiple phase assemblies 38 arrayed along the common axis CA. Each phase assembly 38 includes paired flux rings 40 that are disposed on opposite axial sides of the coil 42 of that phase assembly 38. The flux rings 40 of a single phase assembly 38 are configured to flux pair to generate magnetic flux that drives rotation of rotor 12 relative to stator 14. Each phase assembly 38 is discrete with respect to other phase assemblies 38 of stator 14. As such, phase assemblies 38*a*-38*c* do not radially overlap with each other about the common axis CA. In the example shown, stator 14 includes three phase assemblies 38, though it is understood that stator 14 can be configured to include more or fewer than three phase assemblies 38, such as one, two, four, five, etc.

Each phase assembly 38 includes a respective coil 42. Each coil 42 extends annularly around the common axis CA. Each coil 42 can be coaxial with the common axis CA. The multiple coils 42 are arrayed along the common axis CA at discrete positions such that the coils 42 do not radially overlap with each other, as shown.

The coils 42 are formed as hoops of electrically conductive metal that extends circumferentially about the common axis CA. The coils 42 are thus coaxial with the common axis CA. The coils 42 of each phase assembly 38 are disposed coaxially with respect to each other. Each of the coils 42 is discrete with respect to the other ones of the coils 42. Each coil 42 is a winding of wire, ribbon, etc., typically copper, around the common axis CA. Each coil 42 could be a continuous winding of 20, 30, 40, 50, 100, or less or more loops around the common axis CA. Each coil 42 has two termination wires that extend to wire ends 52. The wire ends 52 represent the ends of the circuit of each coil 42 for running an AC signal through the coil 42. As shown, two wire ends 52 connect with each coil 42. Being that there are three phase assemblies 38*a*-38*c* (and three coils 42), AC signals that are delivered to the respective coils 42 are 120-degrees out of phase with respect to each other.

The coils 42 of the multiple phase assemblies 38 do not radially overlap or cross over each other. No part of any one of the multiple coils 42 is disposed at the same axial location along the common axis CA as any other one of the coils 42. There is an axial gap between each of the coils 42 of the motor 10. The coils 42 are thus located at separate and distinct axial positions along the common axis CA. Each coil 42 is made as a circular loop with the common axis CA extending through each loop of each coil 42. The coils 42 do not include loops wherein the common axis CA does not extend through such loop. The material of the loops formed by coils 42 does not extend axially but instead extends circumferentially about the common axis CA.

Each phase assembly 38 comprises a pair of flux rings 40 and a coil 42 sandwiched between the pair of flux rings 40. Each flux ring 40 can be formed from stacked layers. For example, flux rings 40 can be formed wholly or partially from stacks of laminations. More specifically, ring body 48 of flux ring 40 can be formed by laminations. In some examples, both ring body 48 and teeth 50 can be formed by laminations. Laminations can be formed from material which is readily susceptible to polarization from the fields generated by coils 42. Such material is typically ferromagnetic. The ferromagnetic materials can be metal such as iron or an alloy of iron, such as steel. More specifically, laminations can be formed from silicon steel, among other options. Ferromagnetic material can be ceramic doped or otherwise embedded with ferromagnetic elements.

Each coil 42 is sandwiched axially between the laminate structures of the flux rings 40. Bobbin 46 is disposed axially between flux rings 40 of a phase assembly 38. Bobbin 46 can support the flux rings 40 and can support the coil 42 relative to the flux rings 40.

Each phase assembly 38 further includes axial returns 44 that radially overlap with the coil 42 of that phase assembly 38. The flux rings 40 and bobbin 46 of each phase assembly 38 include slots that the axial returns 44 extend into. Axial returns 44 can be formed from stacked layers of laminations, similar to flux rings 40. Each axial return 44 generally has a lamination grain that is orthogonal to the lamination grain of the flux rings 40. For example, flux rings 40 can be formed from laminate sheets stacked axially and oriented radially. An axial line through the laminate structure of a flux ring 40 extends through each sheet of the laminate stack. The laminate structure of axial returns 44 is oriented transverse to the laminate structure of flux rings 40. In some examples, the laminate sheets of axial returns 44 are disposed orthogonal to the laminate sheets of flux rings 40. Axial returns 44 can be formed from laminate sheets stacked circumferentially and oriented axially. A tangent line to a circle centered on common axis CA and passing through a portion of an axial return 44 can extend through each sheet of the laminate stack of that axial return 44. An arc extending circumferentially about common axis CA can pass through each sheet of the laminate stack of an axial return 44. Flux rings 40 can be considered to have a radial laminate grain while axial returns 44 can be considered to have an axial laminate grain.

Each coil 42 is surrounded on three sides by steel laminations, specifically axially by flux rings 40 and radially by axial returns 44. In the example shown, phase assemblies 38 further include teeth 50 disposed on an opposite radial side of coil 42 from axial returns 44. Teeth 50 are mounted on the paired flux rings 40 and extend axially to radially overlap with coil 42. Each flux ring 40 supports one annular array of teeth 50, with paired flux rings 40 (that respectively sandwich a coil 42) supporting two annular arrays of paired teeth 50 that become polarized with respect to each other when alternating current is run through the coils 42. The teeth 50 of the paired flux rings 40 extend in opposite axial directions such that the teeth 50 of each paired flux ring 40 radially overlap with the coil 42 of that phase assembly 38.

Each tooth 50 is a projection of material that focuses electromagnetic flux, such as steel laminations and/or powdered metal. Each tooth 50 can either be formed by part of flux ring 40 and/or by a powdered metal component that is supported by the flux ring 40. In operation, the flux rings 40 and axial returns 44 receive and focus electromagnetic flux from the coil 42 that they surround and focus the electromagnetic flux towards the pair of teeth 50 which will be oppositely polarized to interact with magnets of the rotor 12. The teeth 50 are disposed radially between the coil 42 and the rotor 12. The axial returns 44 are disposed on an opposite radial side of the coil 42 from the rotor 12.

Support assembly 16 is at least partially disposed within stator 14. Axle 32 supports the electromagnetic components of stator 14. Axle 32 projects axially outward from both axial ends of stator 14. Axle 32 is configured to interface with bearings that rotationally support the rotor 12 relative to the stator 14. Axle end **56*a* extends axially from axle body 54. Axle end 56*a* is formed as a cylindrical projection that extends axially relative to axle body 54. Axle end 56*a* is configured to interface with a bearing that rotatably supports the rotor 12. In the example shown, the axle end 56*a* is configured to support a bearing on the radially outer side of axle end 56*a*. Axle end 56*a* is thus configured to interface with a radially inner race of a bearing that rotationally supports the rotor 12**.

Axle end **56*b* is disposed at an opposite axial end of axle 32 from axle end 56*a*. Axle end 56*b* extends axially relative to axle body 54. Axle end 56*b* projects radially outward to axially overlap with phase assemblies 38*a*-38*c*. Axle end 56*b* extends in an opposite axial direction from axle body 54 than axle end 56*a*. Axle end 56*b* is configured to interface with a bearing that rotatably supports the rotor 12. In the example shown, axle end 56*b* is configured to support a bearing on the radially inner side of axle end 56*b*. Axle end 56*b* is thus configured to interface with a radially outer race of a bearing that rotationally supports the rotor 12**.

Axle body 54 is disposed at least partially within stator 14. Axle body 54 extends axially between axle end **56*a* and axle end 56*b*. Axle body 54 includes axially elongate ligaments 58 that structurally support the phase assemblies 38 of stator 14. Flux rings 40 can be mounted on the ligaments 58. The ligaments 58 extend between and connect axle end 56*a* and axle end 56*b*. Windows 60 are formed circumferentially between ligaments 58. Windows 60 are axially elongate openings through axle body 54. Windows 60 provide openings through which liquid potting compound can flow from radially within axle 32 to radially outside of axle 32 and into phase assemblies 38 during the potting process of the stator 14**, as discussed in more detail below.

Wire slot 62 is formed by one of windows 60. In the example shown, wire slot 62 is a circumferentially largest one of windows 60. Wire slot 62 allows relative sliding movement between axle 32 and phase assemblies 38 (and flux rings 40) during assembly of stator 14 while the wire ends 52 radially project into the wire slot 62. Wire slot 62 thereby facilitates sliding axial assembly of phase assemblies 38 on support assembly 16. Wire slot 62 is configured such that wire ends 52 are not disturbed and electrical connections between wire ends 52 and tabs 68 can be made by the relative sliding movement. Connections between wire ends 52 and tabs 68 can be formed by only relative axial movement between phase assemblies 38 and stator bar 34.

Stator bar 34 is at least partially disposed within the stator 14. Stator bar 34 is at least partially disposed within the axle 32. In the example shown, stator bar 34 has a shorter axial length than axle 32 such that stator bar 34 is fully axially within the axle 32. Axle 32 extends axially outward relative to both axial ends of stator bar 34. In the example shown, stator bar 34 is disposed partially within the stator 14 and extends axially outward relative to the electromagnetic components of stator 14. Specifically, stator bar 34 extends axially beyond both axial ends of the stator 14, in the example shown. Stator bar 34 extends axially beyond the phase assemblies 38.

In the example shown, stator bar 34 is configured as a bus bar that makes electrical connections between an external controller 72 for the motor 10 and coils 42 within the stator 14 that generate the electromagnetic fields that interact with the rotor 12 to rotate the rotor 12. Stator bar 34 can further make data communications connections between external controller 72 and components of stator 14, such as sensor chips, as discussed in more detail below. Bar body 64 is axially elongate and at least partially disposed within axle 32 and stator 14.

End terminals 66 are disposed at an axial end of stator bar 34. End terminals 66 of stator bar 34 are oriented axially. End terminals 66 are oriented axially out of stator 14. Controller 72 is operably connected to end terminals 66, such as by a socket engaging end terminals 66. End terminals 66 are disposed within axle 32. End terminals 66 do not project axially out of axle 32 in the example shown. End terminals 66 being disposed within axle 32 protects end terminals 66 from inadvertent contact that could damage end terminals 66. End terminals 66 are disposed at a location spaced axially from electromagnetic components of stator 14. End terminals 66 are disposed to not radially overlap with a phase assembly 38 of stator 14.

Tabs 68 are oriented radially and are disposed within stator 14. Tabs 68 are configured to interface with wire ends 52. Specifically, each tab 68 is configured to interface with a single wire end 52 of a single coil 42. As discussed in more detail below, stator bar 34 further includes panel 70 that contacts the other wire end 52 of the coil 42. A wire end 52 of the coil 42 of phase assembly **38*a* interfaces with a single one of tabs 68, a wire end 52 of the coil 42 of phase assembly 38*b* interfaces with a single one of tabs 68, and a wire end 52 of the coil 42 of phase assembly 38*c* interfaces with a single one of tabs 68. As discussed in more detail below, each tab 68 is connected to a single one of the end terminals 66. The electrical connections between tabs 68 and end terminals 66 are formed through and extend within bar body 64. As such, electrical communication with each phase assembly 38 is facilitated by an electrical connector that includes a paired set of an end terminal 66 and a tab 68**.

Controller 72 is operably connected to stator 14 by stator bar 34. Stator bar 34 facilitates electrical and data communications signal transmission between controller 72 and motor 10. Controller 72 is operably connected to stator 14 to control operation of motor 10 and control provision of the AC signals to coils 42, thereby controlling the rotational output of motor 10. Controller 72 can be of any desired configuration for controlling operation of motor 10 and can include control circuitry and memory. Controller 72 is configured to store executable code, implement functionality, and/or process instructions. Controller 72 is configured to perform any of the functions discussed herein, including controlling operation of any components referenced herein. Controller 72 can be of any suitable configuration for controlling operation of motor 10, gathering data, processing data, etc. Controller 72 can include hardware, firmware, and/or stored software. Controller 72 can be of any type suitable for operating in accordance with the techniques described herein. While external controller 72 is illustrated as a single unit, it is understood that external controller 72 can be entirely or partially mounted on one or more circuit boards. In some examples, external controller 72 can be implemented as a plurality of discrete circuitry subassemblies.

Figure 3A:
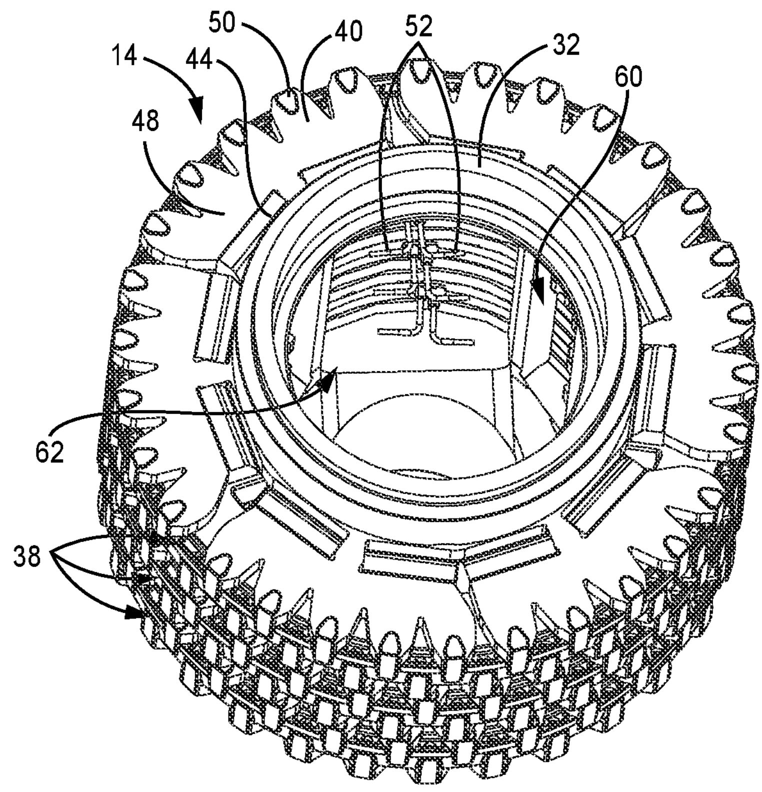
FIG. 3A is an isometric view looking into a stator and showing the stator mounted on an axle.
Figure 3B:
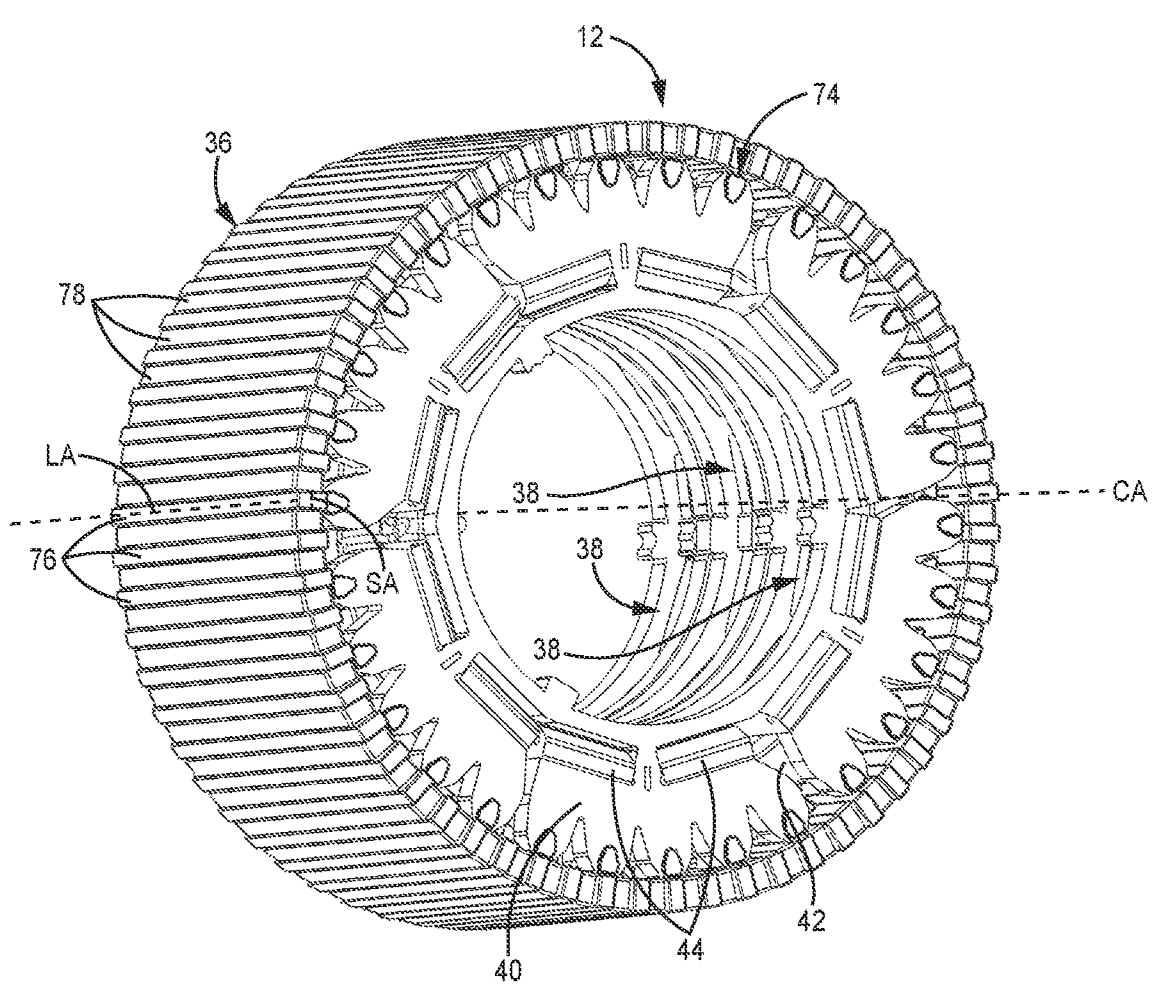
FIG. 3B is an isometric view of the stator showing the permanent magnet array of the rotor disposed around the stator.

FIG. 3A is an isometric view looking into stator 14 and showing stator 14 mounted on axle 32. FIG. 3B is an isometric view of stator 14 showing the permanent magnet array 36 of rotor 12 disposed around stator 14. FIGS. 3A and 3B will be discussed together. As shown, wire ends 52 project from each phase assembly 38 of stator 14. Wire ends 52 project radially inward towards the common axis CA, in the example shown. Wire ends 52 of each phase assembly 38 are axially spaced from each other as the coils 42 of each phase assembly 38 are disposed at discrete locations along the common axis CA.

Each coil 42 includes a pair of wire ends 52 that represent the ends of the circuit of that coil 42. In the example shown, each pair of wire ends 52 extends radially inward through the wire slot 62 of axle 32. The wire ends 52 further extend outward from the radial portion of the wire end 52. The pair of wire ends 52 for a single coil 42 extend away from each other. The pair of wire ends 52 can be considered to extend circumferentially away from each other. The wire ends 52 of a single coil 42 extend away from each other to facilitate making electrical connections with stator bar 34 (best seen in FIGS. 5A-6D), as discussed in more detail below.

As shown in FIG. 3A, phase assemblies 38 can be mounted on axle 32 prior to insertion of stator bar 34 into axle 32. It is understood, however, that not all examples are so limited. For example, stator bar 34 can be assembled to axle 32 prior to mounting one or more of the phase assemblies 38 to support assembly 16.

Motor 10 includes stator 14 surrounded by rotor 12. Stator 14 is configured to drive rotation of rotor 12 about the common axis CA. Both rotor 12 and stator 14 are disposed coaxially on common axis CA. Air gap 74 is disposed radially between rotor 12 and stator 14 and similarly has a cylindrical profile coaxial with the common axis CA.

In the illustrated embodiment, rotor 12 includes permanent magnet array 36. The permanent magnet array 36 includes a plurality of magnets 76. The plurality of magnets 76 are annularly arrayed about the common axis CA. More specifically, the tubular array of the plurality of magnets 76 is coaxial with the common axis CA. The plurality of magnets 76 are circumferentially arrayed about the stator 14. Each magnet 76 has a long axis LA. The long axis LA is orientated axially, parallel with the common axis CA. Each magnet 76 also has a short axis SA. The short axis SA is orientated orthogonal to the long axis LA and tangentially with respect to a circle centered on the common axis CA. Each magnet 76 has permanent poles, north and south, that are circumferentially orientated. More specifically, each magnet 76 has a north pole at one end of the short axis SA and a south pole at the opposite end of the short axis SA.

The permanent magnet array 36 of rotor 12 further includes a plurality of concentrators 78. The plurality of concentrators 78 are interleaved with the plurality of magnets 76 such that the magnets 76 and concentrators 78 alternate and each magnet 76 is bracketed by concentrators 78 and each concentrator 78 is bracketed by magnets 76. In this way, none of the magnets 76 physically contact each other but are nevertheless physically fixed by the plurality of concentrators 78. The plurality of concentrators 78 are orientated axially, such that the long axis of each concentrator 78 is parallel with the common axis CA. The long axis of each concentrator 78 is parallel with the long axis of each magnet 76. Each concentrator 78 can be formed by stacked laminations. The long axis of each lamination is orientated parallel with the common axis CA. As such, the grain of the stack of laminations is oriented axially.

During operation, power is provided to coils 42. Phase assemblies 38 generate electromagnetic fields that interact with the permanent magnet array 36 of the rotor 12 to drive rotation of rotor 12. The embodiment of the motor 10 shown includes three phases corresponding to the three phase assemblies 38 and the coils 42 therein in which three AC signals (e.g., sinusoidal, trapezoidal, etc.) are delivered through the coils 42 120-degrees electrically offset. If there were two phase assemblies 38 and two coils 42, then the two sinusoidal AC signals would be 180-degrees apart, or 90-degrees apart for sets of four phase assemblies 38, etc.

Figure 4A:
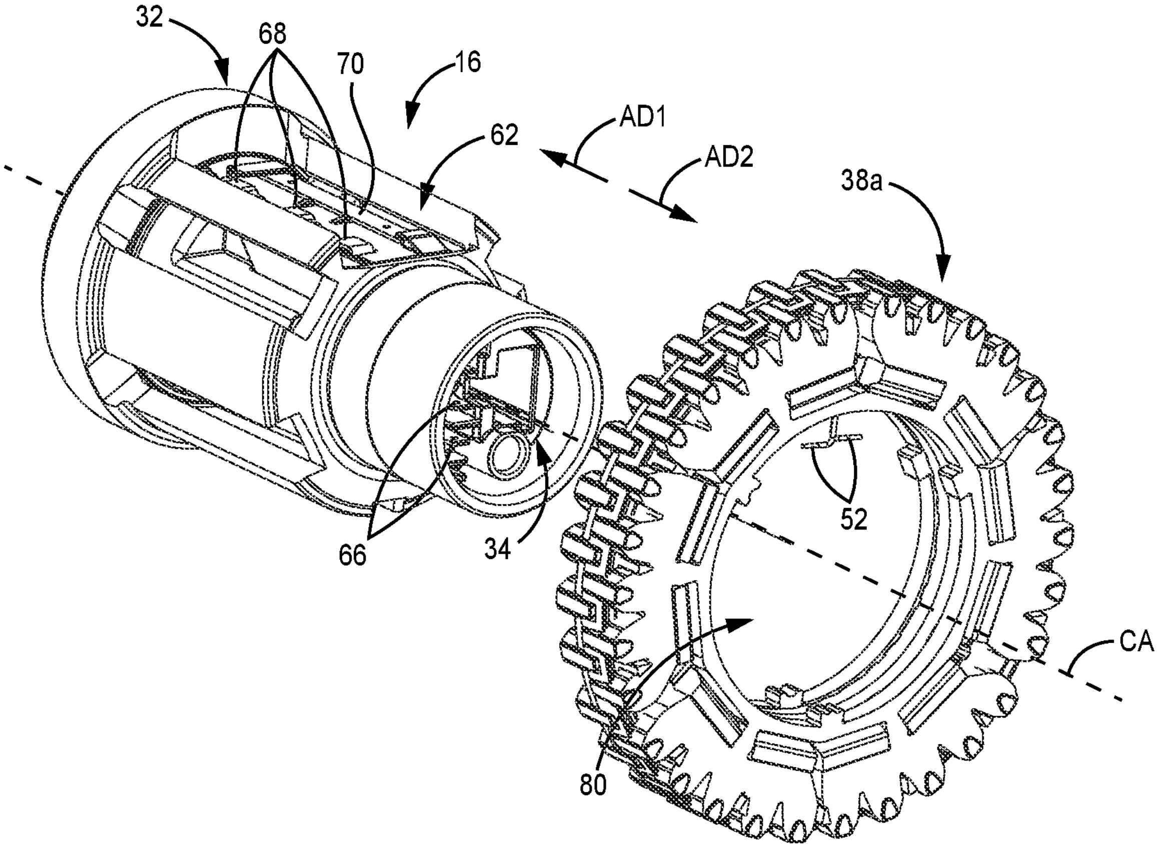
FIG. 4A is an isometric view showing a support assembly and a stator phase disassembled from the support assembly.
Figure 4B:
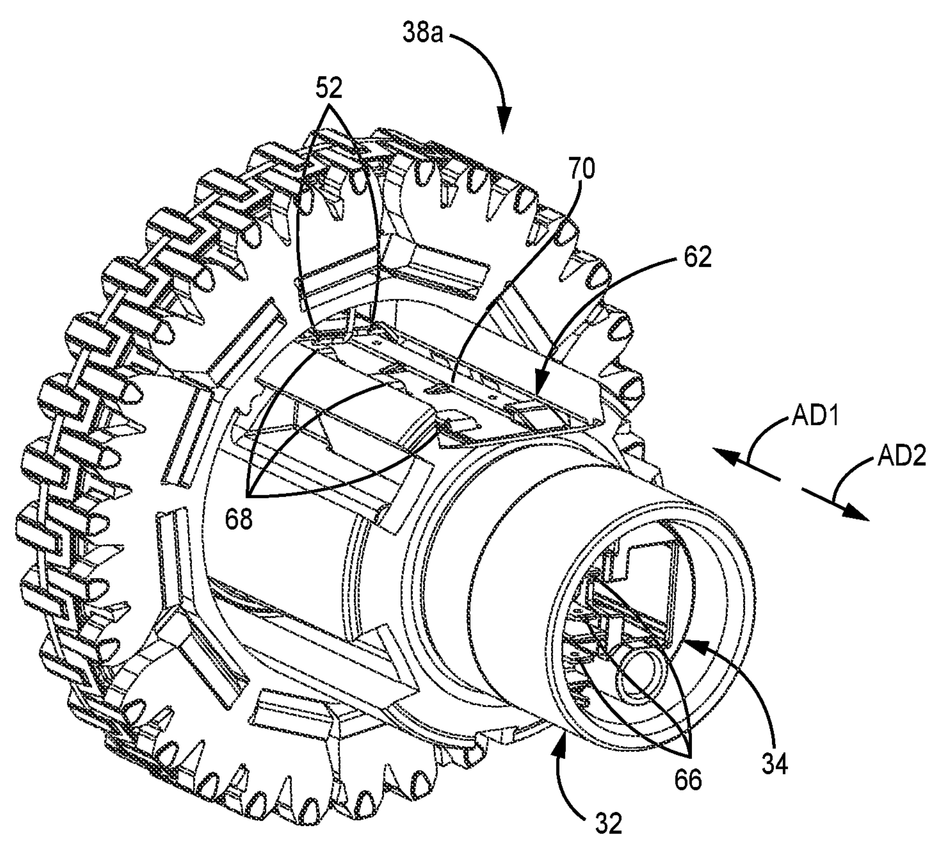
FIG. 4B is an isometric view showing the stator phase mounted on the support assembly.
Figure 4C:
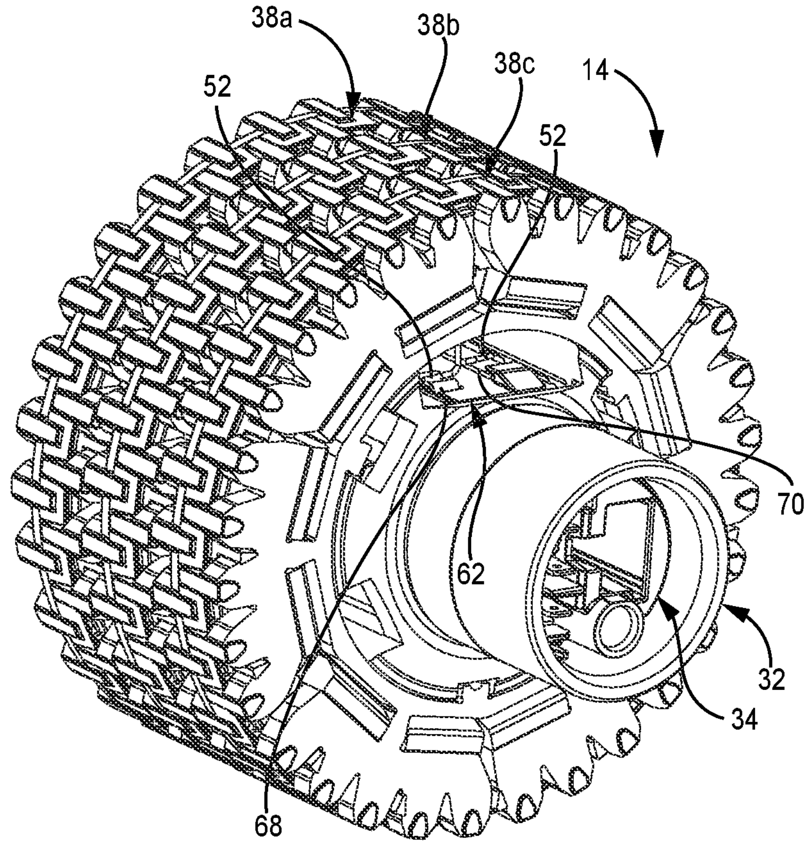
FIG. 4C is an isometric view showing multiple stator phases mounted on the support assembly.

FIGS. 4A-4C shown how stator 14 can be assembled on support assembly 16. FIG. 4A is an isometric view showing support assembly 16 and phase assembly **38*a* disassembled from support assembly 16. FIG. 4B is an isometric view showing phase assembly 38*a* mounted on support assembly 16. FIG. 4C is an isometric view showing multiple phase assemblies 38*a*-38*c* mounted on support assembly 16. FIGS. 4A-4**C will be discussed together.

FIG. 4A shows support assembly 16 assembled together with stator bar 34 disposed within axle 32. It is understood that phase assemblies 38 can be assembled to axle 32 prior to stator bar 34 being inserted into axle 32 or after stator bar 34 is inserted into axle 32. As shown in FIG. 4A, phase assemblies 38 are initially separate from support assembly 16. During assembly, a first phase assembly 38 (phase assembly **38*a* in the example shown) is aligned with support assembly 16 on the common axis CA. The first phase assembly 38*a* is aligned with support assembly 16 such that the common axis CA extends through the central opening 80 of the first phase assembly 38*a* and through support assembly 16. The first phase assembly 38*a* is aligned with support assembly 16 such that wire ends 52 are axially aligned with wire slot 62 formed in axle 32**.

The first phase assembly **38*a* is shifted in first axial direction AD1 to the position shown in FIG. 4B. The first phase assembly 38*a* shifts in first axial direction AD1 such that support assembly 16 passes into and through central opening 80. The wire ends 52 of the first phase assembly 38*a* pass into the wire slot 62. The wire ends 52 slide within the wire slot 62. A first one of the wire ends 52 passes into contact with one of tabs 68. A second one of the wire ends 52 passes into contact with panel 70. The two wire ends 52 of the first phase assembly 38*a* extend away from each other to facilitate contacting the tab 68 and panel 70 and to reduce risk of short circuiting. As discussed in more detail below, the tabs 68 can form primary channel contacts for the wire ends 52 (e.g., load) while the panel 70 can serve as secondary channel contact for the wire ends 52 (e.g., return). Wire ends 52 are in contact with tab 68 and panel 70 to form the electrical connections between the coil 42 of the first phase assembly 38 and stator bar 34, which stator bar 34 facilitates electrical connections with the external controller 72 (FIG. 2B). The wire ends 52 pass into contact with electrical components of stator bar 34 (tabs 68 and panel 70**) by relative sliding movement along the axis CA.

The remaining phase assemblies 38 of the stator 14 are mounted to the support assembly 16 in a similar manner to the first phase assembly **38*a*. The example shown includes three phase assemblies 38, though it is understood that motor 10 can include more or fewer than three phase assemblies 38. Phase assembly 38***b* is aligned with support assembly 16 on common axis CA. Phase assembly 38*b* is shifted in first axial direction AD1 such that support assembly 16 passes through the central opening of phase assembly 38*b*. The wire ends of phase assembly 38*b* pass into wire slot 62 and then into contact with one of tabs 68 and with panel 70. Phase assembly 38*c* is aligned with support assembly 16 on common axis CA. Phase assembly 38*c* is shifted in first axial direction AD1 such that support assembly 16 passes through the central opening of phase assembly 38*c*. The wire ends of phase assembly 38*c* pass into wire slot 62 and then into contact with one of tabs 68 and with panel 70. FIG. 4C shows each of phase assemblies 38*a*-38*c* disposed on support assembly 16 and electrically connected to stator bar 34. The electrical connections between each phase assembly 38 of stator 14 and stator bar 34 can thus be formed by relative sliding axial movement therebetween.

Figure 5A:
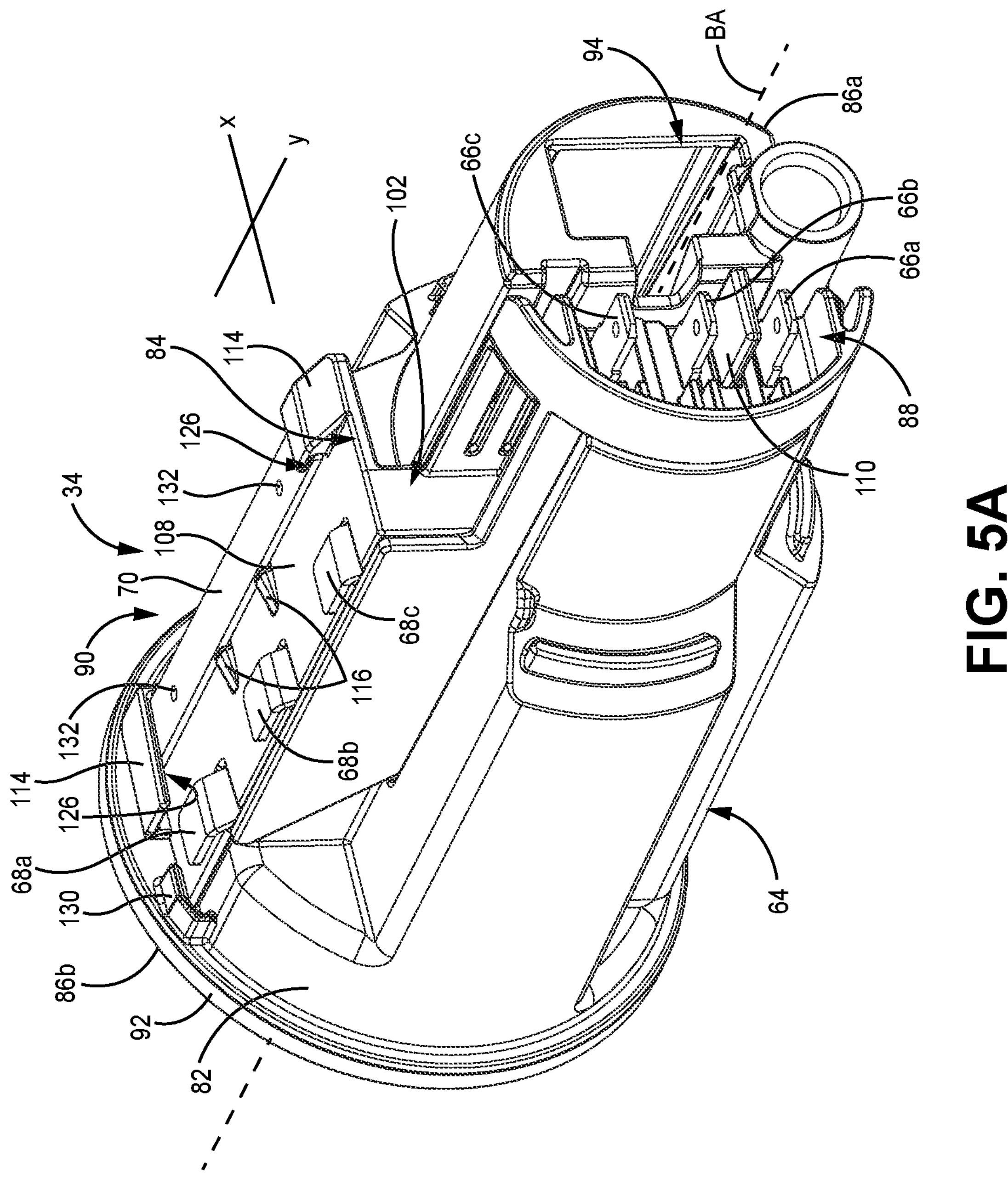
FIG. 5A is an isometric view of a stator bar.
Figure 5B:
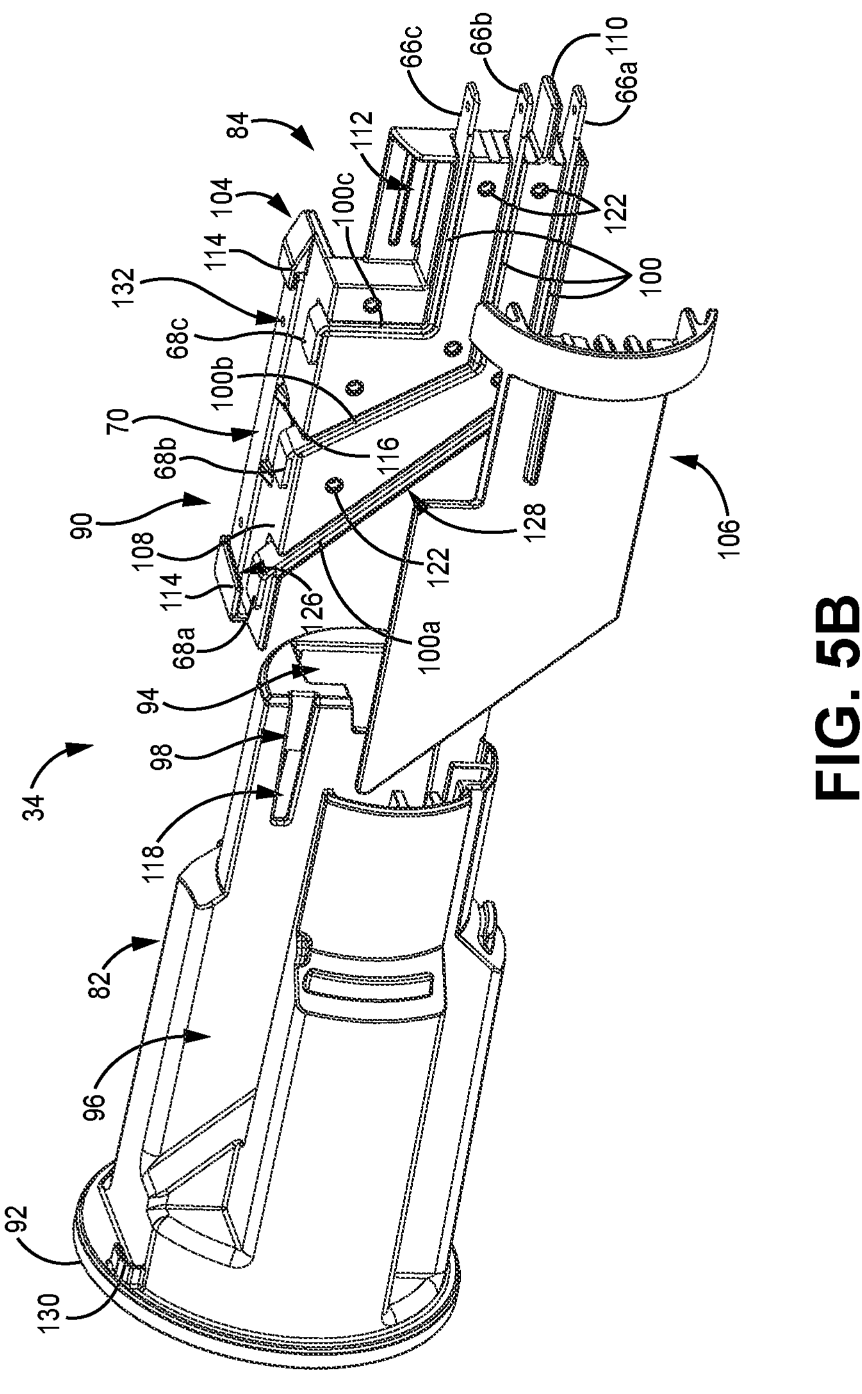
FIG. 5B is a first isometric exploded view of the stator bar.
Figure 5C:
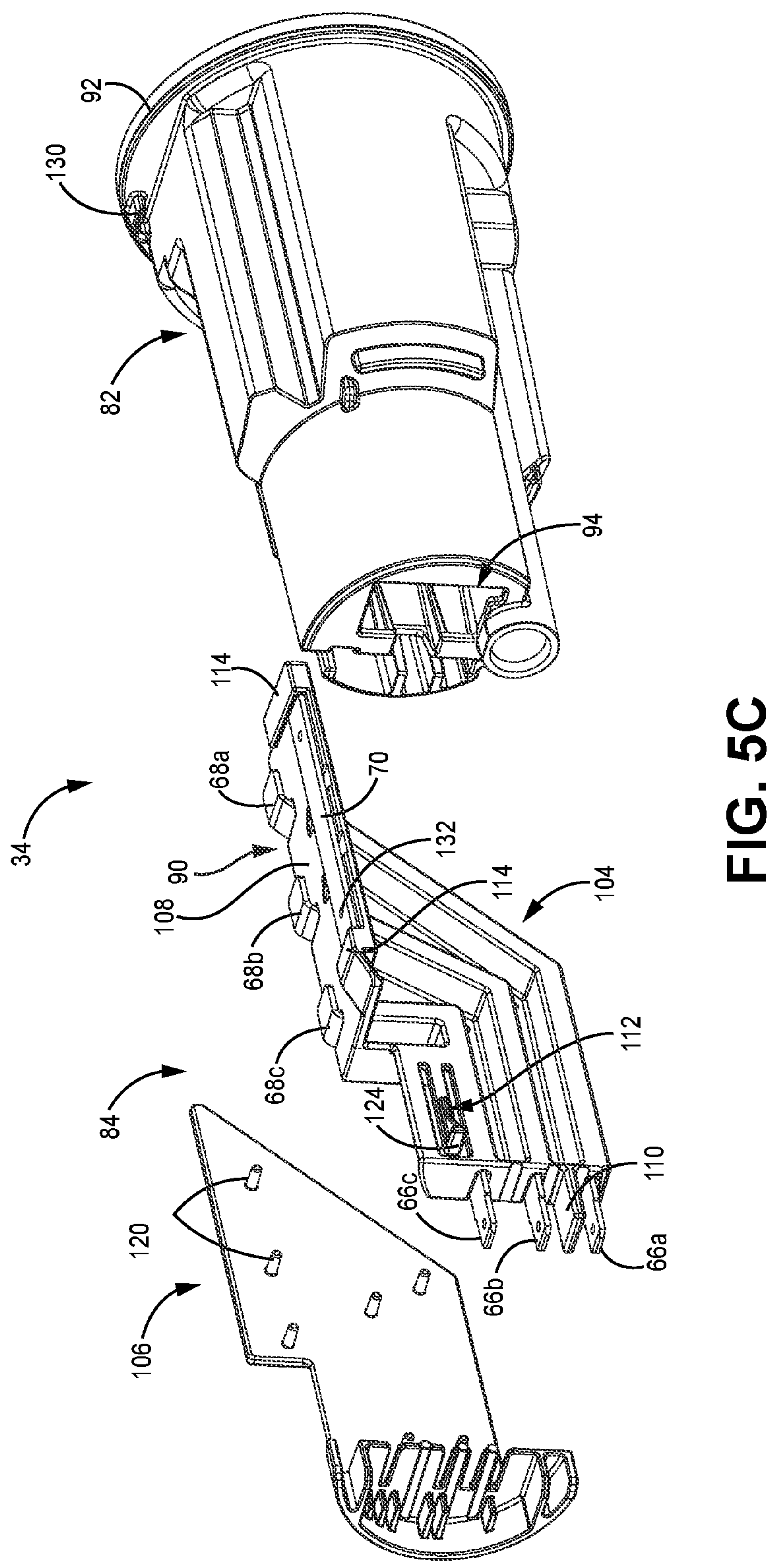
FIG. 5C is a second isometric exploded view of the stator bar.

FIG. 5A is an isometric view of stator bar 34. FIG. 5B is a first isometric exploded view of stator bar 34. FIG. 5C is a second isometric exploded view of stator bar 34. FIGS. 5A-5C will be discussed together. Stator bar 34 includes bar body 64 having base 82 and hub 84, axial end 86*a*, axial end 86*b*, end interface 88, and side interface 90. Base 82 includes mount rim 92, connector opening 94, hub receiver 96, and mount slot 98. Hub 84 includes tabs 68*a*-68*c* (collectively herein "tab 68" or "tabs 68"), end terminals 66*a*-66*c* (collectively herein "end terminal 66" or "end terminals 66"), panel 70, traces 100*a*-100*c* (collectively herein "trace 100" or "traces 100"), and hub body 102. Hub body 102 includes terminal support 104 and cover 106. Terminal support 104 includes side surface 108, end projection 110, locking tab 112, retainers 114, protrusions 116. An X-Y coordinate plane is shown in FIG. 5A. The X-direction can be considered to be a lateral direction and the Y-direction can be considered to be a longitudinal direction.

Stator bar 34 is formed as a bus bar in the example shown, in that stator bar 34 is configured to form data communications and/or electrical connections between an external controller 72 and stator 14. Bar body 64 is elongate along bar axis BA. Stator bar 34 can be generally cylindrical around bar axis BA. Bar body 64 extends axially between axial ends 86*a*, 86*b*. Axial ends 86*a*, 86*b* of stator bar 34 can also be referred to as the longitudinal ends of stator bar 34.

End interface 88 is formed at axial end 86*a* of stator bar 34. End interface 88 is configured to provide interface locations for forming power and/or data communications connections with stator bar 34. End interface 88 includes components configured to provide power and data communications connections with the external controller 72. End interface 88 is disposed at an axially opposite side of stator bar 34 from mount rim 92. Various electrical connections can be made at the end interface 88 for power and/or data signals. As shown, end terminals 66 are disposed at and extend axially from end interface 88. Connector opening 94 is formed at axial end 86*a*. In the example shown, connector opening 94 is formed in base 82. Connector opening 94 provides an opening through which a connector, such as a data connector including ports for power and/or data communications, can extend to form data communications connections with the external controller 72, as discussed in more detail below.

Side interface 90 is formed on a radial side of stator bar 34. Side interface 90 is configured to provide the interfaces with the coils 42 of the stator 14 to provide the electrical connections between stator bar 34 and stator 14. Components of stator bar 34 that electrically connect to coils 42 are formed at side interface 90. In the example shown, side interface 90 includes tabs 68 and panel 70 for making the electrical connections with coils 42. Side interface 90 is configured to be disposed within wire slot 62 of axle 32 with stator bar 34 mounted to axle 32. The side interface 90 includes components for making electrical connections with the wire ends 52 or otherwise for powering the coils 42 of the phase assemblies 38.

Base 82 is configured to support other components of stator bar 34. Base 82 can form the generally cylindrical shape of stator bar 34. Hub 84 is mounted to and supported by base 82. The body of base 82 extends between axial ends 86*a*, 86*b*. Mount rim 92 is disposed at axial end 86*b*. Mount rim 92 is formed at an opposite axial end of stator bar 34 from end interface 88. Mount rim 92 is disposed at an axial end of base 82. Mount rim 92 projects radially outward relative to other portions of base 82. Mount rim 92 can interface with a portion of axle 32 (e.g., at the interface between axle body 54 and axle end 56*b*) with stator bar 34 disposed within axle 32. Mount rim 92 can interface with axle 32 to limit the axial distance that stator bar 34 can move into axle 32. Mount rim 92 interfacing with axle 32 can thereby axially position stator bar 34 within the stator 14 to provide desired alignment with the wire ends 52 extending from the stator 14. Mount rim 92 interfacing with axle 32 can further define a seal that limits flow of liquid potting compound within the stator 14. The mount rim 92 can seal against the axle 32 to prevent potting compound from flowing from one side of that interface to another side, as discussed in more detail below.

Hub receiver 96 is formed in base 82. Hub receiver 96 is formed as an axially elongated slot within base 82. Hub receiver 96 is configured to receive hub 84 with hub 84 mounted to base 82. Hub 84 is at least partially disposed within hub receiver 96 when mounted to base 82. The hub receiver 96 includes at least one radially open side, which is aligned with side interface 90 with hub 84 mounted to base 82. The tabs 68 are thus exposed out of base 82 with hub 84 mounted to base 82. Hub receiver 96 is also open at axial end 86*a*. Hub receiver 96 is open at axial end 86*a* to facilitate axial mounting of hub 84 to base 82. Hub retainer 130 projects from base 82. Hub retainer 130 extends over a portion of hub 84 when hub 84 is mounted to base 82 to secure hub 84 radially on base 82. In the example shown, a portion of side surface 108 extends into a slot defined by hub retainer 130.

Mount slot 98 is formed in the body of base 82. Mount slot 98 is configured to interface with a portion of hub 84 to secure hub 84 to base 82. In the example shown, mount slot 98 is axially elongate and includes mounting recess 118. Mounting recess 118 can be formed as an aperture extending fully through the wall that mount slot 98 is formed in. Hub 84 is supported by base 82 with stator bar 34 assembled together.

Hub 84 includes terminal support 104, which supports the electrical connectors of stator bar 34, and cover 106. Tabs 68 and end terminals 66 project from terminal support 104. Traces 100 extend through terminal support 104 between tabs 68 and end terminals 66. Panel 70 is supported on terminal support 104. Cover 106 is configured to interface with terminal support 104 to enclose traces 100 within hub 84 and retain traces within hub 84. Posts 120 project from cover 106 and are configured to extend into apertures 122 within terminal support 104 to connect cover 106 to terminal support 104. It is understood, however, the cover 106 and terminal support 104 can be connected together in any desired manner. For example, posts 120 can extend from terminal support 104 into apertures 122 formed in cover 106.

Locking tab 112 is formed as a portion of terminal support 104. Locking tab 112 is cantilevered and configured to flex. Locking tab 112 includes mount projection 124 that extends laterally away from the body of the locking tab 112. Mount projection 124 includes a sloped face oriented in first axial direction AD1. Locking tab 112 is configured to interface with mount slot 98 to secure hub 84 to base 82. Specifically, mount projection 124 is configured to enter into and be disposed within mounting recess 118 to axially secure hub 84 relative to base 82.

The electrical connecting components of stator bar 34 are supported by hub 84. Tabs 68 are disposed on side interface 90. Specifically, tabs 68 project through side surface 108 of hub 84. Side surface 108 is a flat surface on which the components of stator bar 34 that are configured to directly interface with the coils 42 are disposed. Side surface 108 is a flat surface that is oriented orthogonal to a radial line extending from the bar axis BA. Side surface 108 is formed by terminal support 104 in the example shown.

Retainers 114 are formed on hub 84. In the example shown, retainers 114 are formed on terminal support 104. Each retainer 114 extends from side surface 108 and defines a panel slot 126 between the retainer 114 and side surface 108. Panel 70 extends into the panel slots 126 such that retainers 114 retain panel 70 on hub 84. Retainers 114 inhibit movement of panel 70 radially away from side surface 108. Retainers 114 further inhibit axial movement of panel 70 along the side surface 108. In the example shown, retainers 114 define panel slots 126 such that panel slots 126 are open on one lateral side, through which panel 70 enters into panel slots 126, and such that panel slots 126 are closed on the other lateral side. The panel slots 126 are open longitudinally towards each other, to facilitate panel 70 extending between the panel slots 126. Panel slots 126 are closed on the other longitudinal ends to prevent axial movement of panel 70 relative to side surface 108.

Protrusions 116 project from side surface 108. Protrusions 116 are disposed on a lateral side of panel 70. Protrusions 116 are configured to retain panel 70 within panel slots 126 and prevent lateral movement of panel 70 out of panel slots 126.

Panel 70 includes panel openings 132 that extend therethrough. Panel openings 132 can extend fully through panel 70. Panel openings 132 allow potting compound to extend through panel 70, which assists in fixing panel 70 on bar body 64.

Tabs 68 and panel 70 form the electric connection components of side interface 90. Tabs 68 are exposed on side interface 90. Tabs 68 project through side surface 108 to be exposed on the exterior of stator bar 34. The multiple tabs 68 of stator bar 34 are arrayed axially along the side surface 108. The tabs 68 are spaced longitudinally along stator bar 34. Tab 68*a* is spaced axially from tab 68*b* and tab 68*c*, and tab 68*b* is spaced axially from tab 68*c*. The tabs 68 can be fully or partially axially aligned with each other along the interface side. In the example shown, each of the tabs 68 axially overlaps with the other ones of tabs 68. Axially aligning tabs 68 allows any phase assembly 38, such as in cases in which phase assemblies 38 are identical, to be mounted to electrically connect with any one of tabs 68. The axial alignment facilitates the wire ends 52 contacting the aligned tab 68 without requiring additional manipulation or reconfiguration of the phase assemblies 38.

In the example shown, tabs 68 project outward, away from the side surface 108. The tabs project through the flat side surface 108 and away from that flat side surface 108. Tab 68*a* projects a first distance from side surface 108, tab 68*b* projects a second distance from side surface 108, and tab 68*c* projects a third distance from side surface 108. In the example shown, the first distance is greater than the second distance and the second distance is greater than the third distance. The variable distances that tabs 68 project from side surface 108 facilitates axial, sliding mounting of phase assemblies 38 and stator bar 34. During mounting, one of the wire ends 52 of a first phase assembly 38 passes over tab 68*c*, then passes over tab 68*b*, and then passes into alignment with tab 68*a* such that that wire end 52 contacts tab 68*a*. The wire end 52 encountering and then passing over a tab 68 can distort the wire end 52 such that the wire end 52 does not snap back to the same position after passing over the tab 68. The distance that tabs 68 project from side surface 108 increases from the tab 68 closest to axial end 86*a* and towards axial end 86*b*. The increasing projection distance increases in the same direction that phase assemblies 38 mount to stator bar 34. The increasing projection distance facilitates contact between the wire end 52 and tabs 68 during mounting.

Panel 70 is disposed on side surface 108. Panel 70 is spaced laterally away from tabs 68. Panel 70 is configured to contact wire ends 52 of each of the multiple phase assemblies 38. Panel 70 provides a return that facilitates formation of the electrical circuits through the phase assemblies 38. Each of the multiple phase assemblies 38 are electrically connected to the panel 70.

Tabs 68 and panel 70 are each disposed on side surface 108 of stator bar 34. Tabs 68 and panel 70 are all disposed within a 90-degree arc of each other about the bar axis BA. Tabs 68 and panel 70 being disposed within a less than or equal to 90-degree angular arc relative to each other facilitates quick and efficient mounting of phase assemblies 38 on stator bar 34.

Traces 100 extend within hub 84 between tabs 68 and end terminals 66. Specifically, trace 100*a* extends between end terminal 66*a* and tab 68*a*, trace 100*b* extends between end terminal 66*b* and tab 68*b*, and trace 100*c* extends between end terminal 66*c* and tab 68*c*. Each trace 100 is disposed within a trace slot 128 formed in terminal support 104 of hub 84. The trace slots 128 extend between the axially oriented end interface 88 and the radially oriented side interface 90. Cover 106 connects to terminal support 104 and encloses traces 100 within hub 84. Traces 100 electrically connect the tabs 68 and the end terminals 66. More specifically, each trace 100 electrically connects a single one of tabs 68 with a single one of end terminals 66. The traces 100 are electrically isolated from each other within hub 84 by the material forming terminal support 104.

End terminals 66 project from axial end 86*a* of stator bar 34. In the example shown, the end terminals 66 are aligned with each other in a direction orthogonal to the X-Y plane. In the example shown, the end terminals 66 are aligned in a plane parallel to the common axis CA. In some examples, the end terminals 66 can be aligned on a plane extending along and intersecting the common axis CA. End terminals 66 are configured to connect to a socket, or other electrical connector, to electrically connect stator bar 34 to the external controller 72.

Each set of a trace 100, tab 68, and end terminal 66 can be considered to form an electrical connector that electrically connects the power source and a coil 42. For example, trace 100*a*, tab 68*a*, and end terminal 66*a* form a first electrical connector of stator bar 34. The electrical connectors are exposed both axially and radially on stator bar 34.

The electrical connectors extend from surfaces that are oriented orthogonally to each other. Specifically, end terminals 66 extend axially from axial end 86*a* while tabs 68 extend radially from side surface 108. Traces 100 redirect the electrical connectors between the axial orientation and the radial orientation.

End projection 110 extends axially relative to the common axis CA, similar to end terminals 66. End projection 110 is disposed at axial end 86*a*. End projection 110 is disposed between two of the end terminals 66. In the example shown, end projection 110 is disposed between end terminal 66*a* and end terminal 66*b*. It is understood, however, that end projection 110 can be disposed between end terminal 66*b* and end terminal 66*c*, in other examples. In other examples, end projection 110 can be disposed adjacent to, but not between, end terminals 66. End projection 110 provides a mistake proofing feature that prevents the socket from being connected to end terminals 66 in an incorrect orientation. Each of the end terminals 66 is associated with a single one of coils 42 to provide driving signals to that coil 42. End projection 110 is configured to fit into a slot in the socket and prevents the socket from being connected to end terminals 66 in an inverted orientation.

Hub 84 is assembled together by connecting cover 106 to terminal support 104. Posts 120 extend into apertures 122 and enclose traces 100 within hub 84. Hub 84 is assembled to base 82 to form stator bar 34. In the example shown, hub 84 can be assembled to base 82 by sliding axial movement of hub 84 relative to base 82. The hub 84 inserted into hub receiver 96 formed in base 82. The hub receiver 96 can be formed as an axially elongated slot in base 82.

Hub 84 interfaces with base 82 to prevent relative axial movement therebetween with hub 84 mounted to base 82. In the example shown, the ramped face of mount projection 124 encounters the end face of base 82, which causes locking tab 112 to flex such that mount projection 124 can enter into mount slot 98. Mount projection 124 slides along and within mount slot 98. The arm of locking tab 112 causes mount projection 124 to spring into mounting recess 118. Mount projection 124 being disposed in mounting recess 118 axially secures hub 84 on base 82.

Hub 84 is mounted to base 82 such that end terminals 66, tabs 68, and panel 70 are exposed on the exterior of stator bar 34. The exposed end terminals 66 facilitate connection with the external controller 72 to provide driving AC signals to the various phase assemblies 38 through the electrical connectors to facilitate generating the electromagnetic fields to drive rotation of the rotor 12. Traces 100 are internal to stator bar 34 and extend between and connect end terminals 66 and tabs 68. Tabs 68 are exposed to facilitate discrete electrical connections with each coil 42 of the stator 14. Panel 70 is continuous and connected to each coil 42 of the stator 14. Panel 70 is exposed to facilitate return for the electrical signals through the coils 42.

As shown, the motor 10 includes a count of coils 42, which is the number of coils 42 of the stator 14. In the example shown, the coil count is three, though it is understood that other numbers are possible in other examples. The stator bar 34 includes a count of end terminals 66, which is the number of end terminals 66 of the stator bar 34. The stator bar 34 includes a count of tabs 68, which is the number of tabs 68 of the stator bar 34. In the example shown, the count of end terminals 68 is the same as the count of coils 42. Stator bar 34 includes three end terminals 68 and stator 14 includes three coils 42. In the example shown, the count of tabs 68 is the same as the count of coils 42. Stator bar 34 includes three tabs 68 and stator 14 includes three coils 42.

Stator bar 34 provides significant benefits. Tabs 68 and panel 70 are all exposed on a same side of stator bar 34. The aligned tabs 68 facilitate forming electrical connections with discrete phase assemblies 38 that include coils 42 extending circumferentially about the common axis CA. The panel 70 is exposed on the same side as tabs 68, and within a 90-degree arc about the common axis CA, simplifying the structure of motor 10. All tabs 68 and panel 70 are disposed on the same flat side surface 108 of stator bar 34. Forming the electrical connections between stator bar 34 and coils 42 on the same side surface 108 facilitates easy installation and connection. Panel 70 connects to each coil 42 of the stator 14 to facilitate forming the return for the circuit through each coil 42.

Stator bar 34 is formed as a multi-part stator bar 34 in the example shown. Different configurations of hub 84 can be mounted to base 82 such that the same configuration of base 82 can be utilized in motors having different numbers of coils 42. For example, a hub 84 with only two electrical connectors can be mounted to base 82 for a motor having only two phase assemblies 38, a hub 84 having four electrical connectors can be mounted to base 82 for a motor having four phase assemblies 38, etc. Such a configuration reduces part counts, increases the efficiency of motor assembly, and reduces costs.

End terminals 66 are oriented axially to make axial connections while tabs 68 are oriented radially to make radial connections. End terminals 66 and tabs 68 extend orthogonally relative to each other. The relative alignments of the end terminals 66 and tabs 68 facilitates making connections with the wire ends 52 of the circumferential coils 42 and along the axis of the motor 10. The coils 42 extend circumferentially about the common axis CA and each phase assembly 38 includes a central opening 80 that the stator bar 34 is disposed within. The axially oriented end terminals 66 allow for the socket that connects to the end terminals 66 to be inserted into the stator axially, allowing for simple and easy connection of the controller 72 to the stator bar 34 and thus to the stator 14.

Figure 6A:
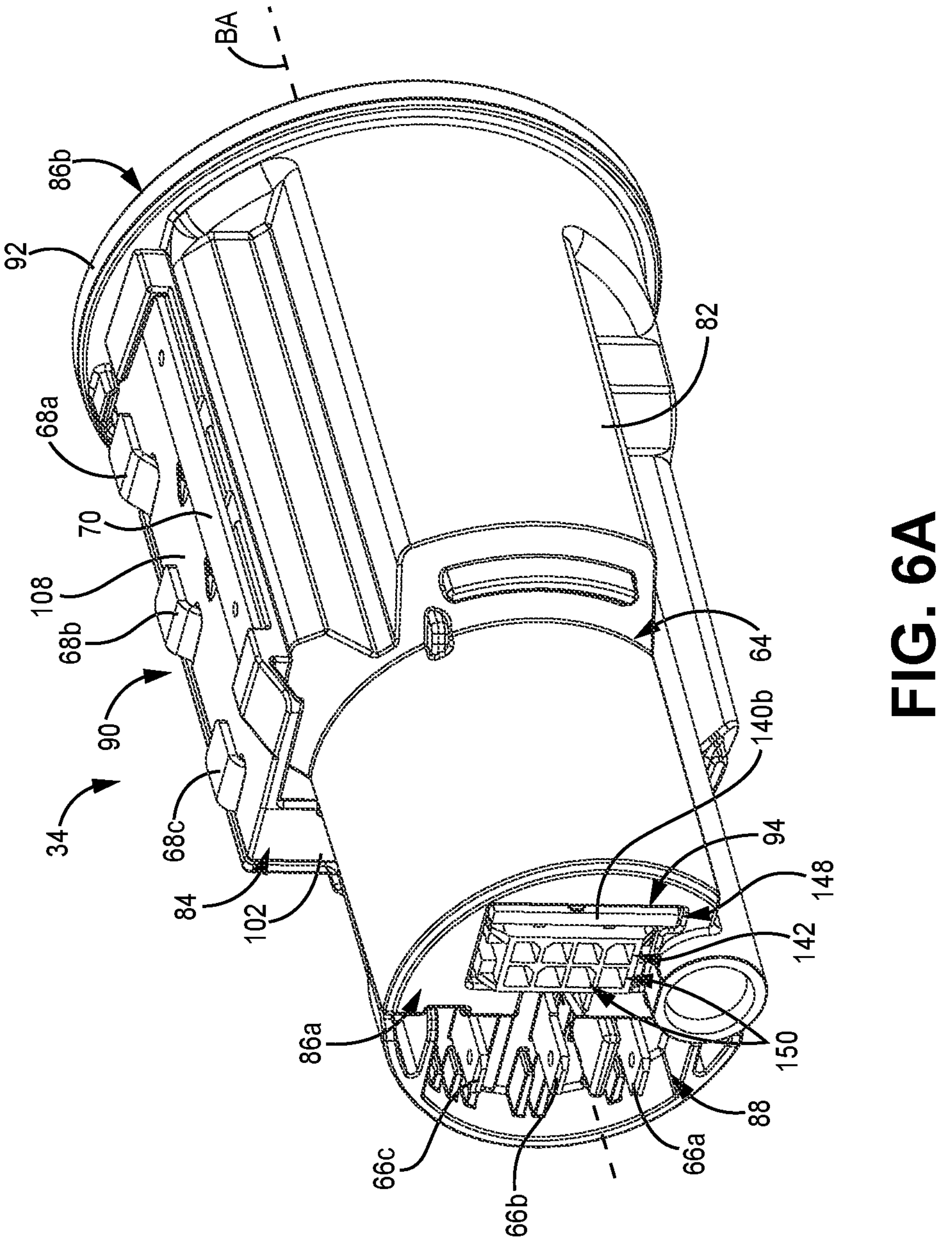
FIG. 6A is a first isometric view of a stator bar with a board assembly mounted to the stator bar.
Figure 6B:
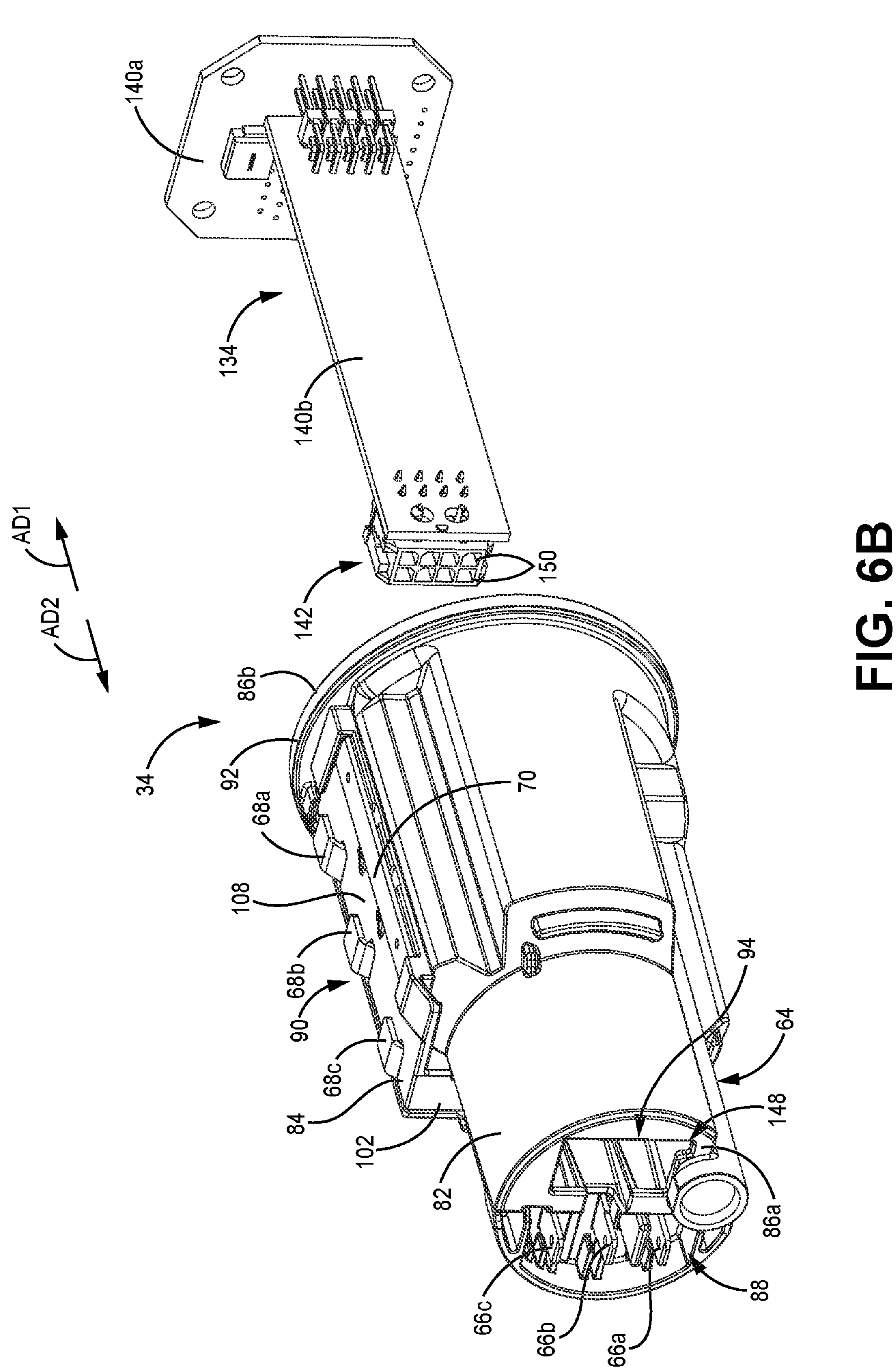
FIG. 6B is an isometric view similar to that shown in FIG. 6A but showing the board assembly exploded away from a body of the stator bar.
Figure 6C:
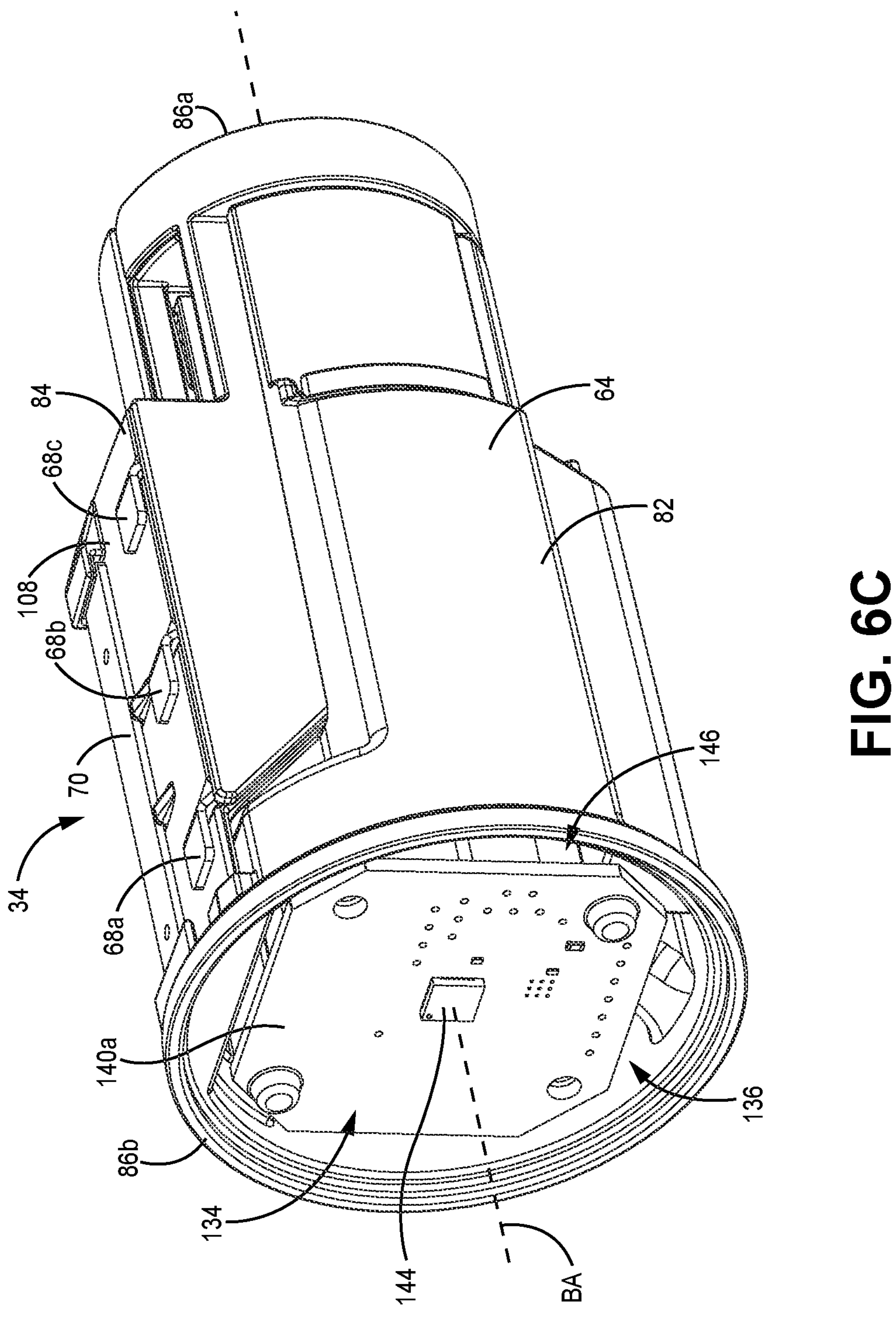
FIG. 6C is a second isometric view of the stator bar taken from an opposite axial end of the stator bar from that shown in FIG. 6A.
Figure 6D:
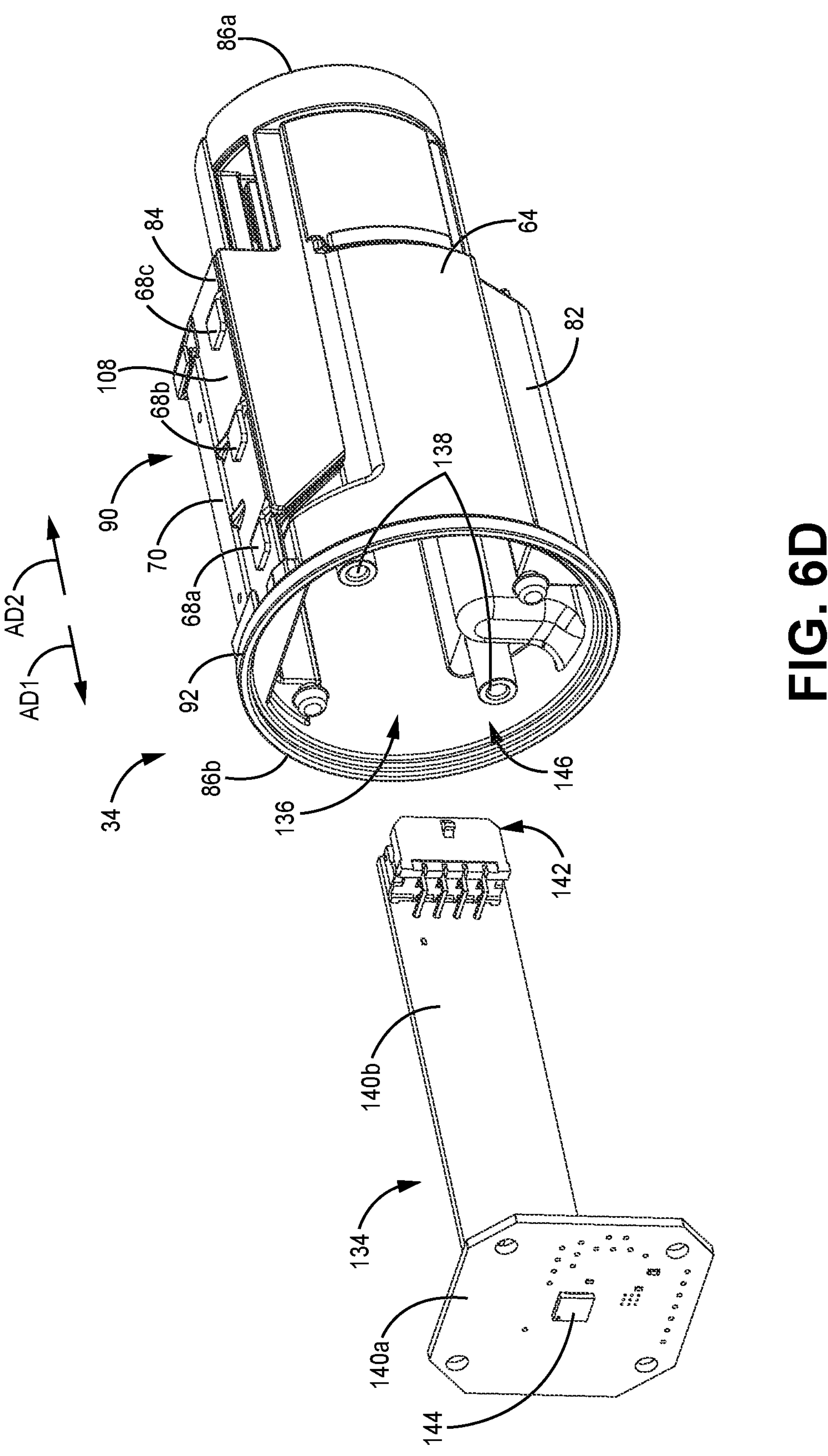
FIG. 6D is an isometric view similar to that shown in FIG. 6C but showing the board assembly exploded away from the body of the stator bar.

FIG. 6A is a first isometric view of stator bar 34 with board assembly 134 mounted to stator bar 34. FIG. 6B is an isometric view similar to that shown in FIG. 6A but showing board assembly 134 exploded away from bar body 64. FIG. 6C is a second isometric view of stator bar 34 taken from an opposite axial end of stator bar 34 from that shown in FIG. 6A. FIG. 6D is an isometric view similar to that shown in FIG. 6C but showing board assembly 134 exploded away from bar body 64. FIGS. 6A-6D will be discussed together.

Base 82, hub 84, axial ends 86*a*, 86*b*, end interface 88, side interface 90, and board assembly 134 of stator bar 34 are shown. Mount rim 92, connector opening 94, cavity 136, and mounting openings 138 of base 82 are shown. Tabs 68*a*-68*c* (collectively herein "tab 68" or "tabs 68"), end terminals 66*a*-66*c* (collectively herein "end terminal 66" or "end terminals 66"), panel 70, and hub body 102 of hub 84 are shown. Board assembly 134 includes circuit boards 140*a*, 140*b*, connector 142, and sensor chip 144.

Stator bar 34 is a bus bar in the example shown. Stator bar 34 is configured to transmit power signals and data communications signals. Stator bar 34 forms power and data communications connections between motor 10 and an exterior controller 72. End terminals 66 are configured to connect to a socket to receive power from an external power source, such as external controller 72 (FIG. 2B). Tabs 68 are configured to contact wire ends 52 (best seen in FIG. 3A) of the various phase assemblies 38 (best seen in FIG. 2B) to provide power to the coils 42 (best seen in FIG. 2B) of the stator 14. Each tab 68 is configured to contact a single wire end 52 of a single coil 42. Each end terminal 66 is associated with a single tab 68. Panel 70 is configured to contact the other wire end 52 of the coil 42 that is not contacting the tab 68. In the example shown, panel 70 is configured to contact a wire end 52 of each coil 42 of the stator 14. As such, panel 70 can be considered to be operably associated with each coil 42 of the stator 14.

As discussed above, the electrical connectors formed by end terminals 66, tabs 68, and panel 70 are supported by hub 84 of stator bar 34. Hub 84 is supported by base 82. Tabs 68 and panel 70 are exposed on side interface 90 of stator bar 34. End terminals 66 extend axially from and are exposed on axial end 86*a* of stator bar 34. Connector opening 94 is formed in axial end 86*a* of stator bar 34. Specifically, connector opening 94 is formed in base 82. Connector opening 94 is disposed adjacent to end terminals 66 and spaced laterally from end terminals 66.

Mount rim 92 is formed at axial end 86*b* of stator bar 34. Axial end 86*b* is an opposite axial end of stator bar 34 from axial end 86*a*. Mount rim 92 is formed by base 82, in the example shown. As shown, the axial end 86*a* is smaller in diameter than the rest of the stator bar 34, as the stator bar 34 generally expands in diameter from the axial end 86*a* towards axial end 86*b*. Mount rim 92 is a radially enlarged portion of stator bar 34 relative to other portions of stator bar 34.

Cavity 136 is formed within stator bar 34. Cavity 136 is open on axial end 86*b* of stator bar 34. Cavity 136 extends between the cavity opening 146 formed in axial end 86*b* and the connector opening 94 formed in axial end 86*a*. Mounting openings 138 are at least partially disposed within cavity 136. Mounting openings 138 are configured to receive fasteners to mount board assembly 134 to base 82. Mounting openings 138 are formed in base 82. In the example shown, at least some of the mounting openings 138 are formed in posts that are disposed in the cavity 136.

Board assembly 134 is supported by stator bar 34. In the example shown, board assembly 134 is supported by base 82 of stator bar 34. Board assembly 134 is at least partially disposed within and extends through cavity 136. As shown, the board assembly 134 includes circuit board 140*a* and circuit board 140*b* that are connected together. Circuit board 140*a* and circuit board 140*b* can be formed as printed circuit boards (PCBs), among other options.

Circuit board 140*a* is configured to mount to bar body 64 of stator bar 34. Specifically, circuit board 140*a* is configured to mount to base 82. Circuit board 140*a* is fixed to base 82. In the example shown, circuit board 140*a* is mounted to base 82 by fasteners, e.g., bolts, extending through circuit board 140*a* and into the mounting openings 138 that are formed in base 82. Circuit board 140*a* is located within the cavity 136. When installed it in the stator bar 34, circuit board 140*a* is located in the cavity opening 146. The cavity opening 146 can be defined by mount rim 92. Circuit board 140*a* can be disposed adjacent to mount rim 92. In some examples, circuit board 140*a* is positioned to radially overlap with mount rim 92. Circuit board 140*a* can be fully disposed within cavity 136 such that no portion of circuit board 140*a*, or the components mounted on circuit board 140 (e.g., chip 144), extends axially out of cavity 136. Having circuit board 140*a* disposed fully within cavity 136 projects circuit board 140*a* and inhibits inadvertent contact with or damage to circuit board 140*a*.

Circuit board 140*a* is oriented orthogonal to the common axis CA and to the bar axis BA. Circuit board 140*a* is configured to be positioned such that the common axis CA extends through circuit board 140*a* with stator bar 34 mounted to stator 14. Chip 144 is mounted to circuit board 140*a*. Chip 144 is exposed through the cavity opening 146 in axial end 86*b*. In the example shown, chip 144 is a sensor chip configured to generate data regarding operation of motor 10. For example, chip 144 can be an encoder chip configured to sense rotation of rotor 12 and generate data regarding such rotation, which can be utilized for commutating motor 10.

Circuit board 140*b* is mounted on and supported by circuit board 140*a*. In the example shown, circuit board 140*b* is oriented orthogonal to circuit board 140*a*. Circuit board 140*b* extends axially while circuit board 140*a* is oriented normal to the board axis BA. Circuit board 140*b* extends for almost the entirety (e.g., at least 90%), and at least more than half, of the length of the stator bar 34. More specifically, circuit board 140*b* can extend from the mount rim 92 to the connector opening 94. In the example shown, a distal end of circuit board 140*b*, which is the end of circuit board 140*b* opposite circuit board 140*a*, is exposed through connector opening. Circuit board 140*b* extends into notch 148 formed in connector opening 94. Circuit board 140*b* extending into notch 148 locates the distal end of circuit board 140*b* relative to bar body 64. Circuit board 140*b* being disposed at least partially in notch 148 prevents twisting of circuit board 140*b*. Circuit board 140 is thereby supported at both axial ends 86*a*, 86*b*.

Connector 142 is mounted on circuit board 140*b*. Connector 142 is thus disposed on a different circuit board from chip 144. Connector 142 is disposed at an opposite axial end of board assembly 134 from chip 144. Connector 142 is disposed at the distal end of circuit board 140*b* opposite circuit board 140*a*. As shown in FIG. 6A, connector 142 is disposed in connector opening 94 with board assembly 134 mounted to stator bar 34. Connector 142 and end terminals 66 can be considered to form the end interface 88 of stator bar 34. The end interface 88 is configured to provide power and data communications for motor 10. Connector 142 includes ports 150 for power and/or data signals to circuitry within stator 14 (e.g., to chip 144 among other options), as further shown herein.

Board assembly 134 can be mounted to stator bar 34 by purely axial movement of board assembly 134 relative to stator bar 34. During mounting, board assembly 134 is aligned with cavity opening 146, as shown in FIGS. 6B and 6D. Board assembly 134 is shifted in second axial direction AD2 such that connector 142 and circuit board 140*b* enter into cavity 136 through cavity opening 146. Board assembly 134 is shifted in second axial direction AD2 until connector 142 enters into connector opening 94. Circuit board 140*b* enters into notch 148 and the fastener openings through circuit board 140*a* are aligned with mounting openings 138. Circuit board 140*a* is fastened to stator bar 34 to secure board assembly 134 to stator bar 34. In the example shown, board assembly 134 is secured within stator bar 34 by fasteners extending through circuit board 140*a* and into the mounting openings 138 of base 82.

Stator bar 34 and board assembly 134 provide significant advantages. Stator bar 34 supports components for providing both electrical signals to coils 42 of stator 14 to control generation of the electromagnetic fields generated by stator 14, thereby controlling rotation of the rotor 12 relative to stator 14. The end interface 88 provides locations for forming both power and data communications connections with motor 10. The end interface 88 is oriented axially, facilitating simple connection to the end terminals 66 and connector 142. Side interface 90 is oriented radially, facilitating simple connection of tabs 68 and panel 70 with coils 42. Board assembly 134 is formed separately from stator bar 34 such that board assembly 134 can be removed from stator bar 34 and replaced as needed. As such, different configurations of board assembly 134 can be mounted to a base configuration of stator bar 34, depending on the particular motor that the stator bar 34 is being utilized for. Such a configuration reduces part count and provides cost savings. Further, the board assembly 134 can be removed from motor 10 while stator bar 34 remains potted within the stator 14. This allows for replacement of a circuit board 140*a*, 140*b*, chip 144, or connector 142 as needed.

Board assembly 134 is mountable to stator bar 34 by axial movement of board assembly 134 relative to stator bar 34. Mounting board assembly 134 by axial movement provides for simple installation, reducing assembly time and costs. Board assembly 134 is formed by circuit boards 140*a*, 140*b* that are disposed perpendicular to each other. The configuration of circuit boards 140*a*, 140*b* facilitates the axial mounting of board assembly 134 on stator bar 34. The orthogonal orientation of circuit board 140*a* relative to the common axis CA facilitates positioning of sensor chip 144 to sense rotation of rotor 12 relative to stator 14.

Figure 7:
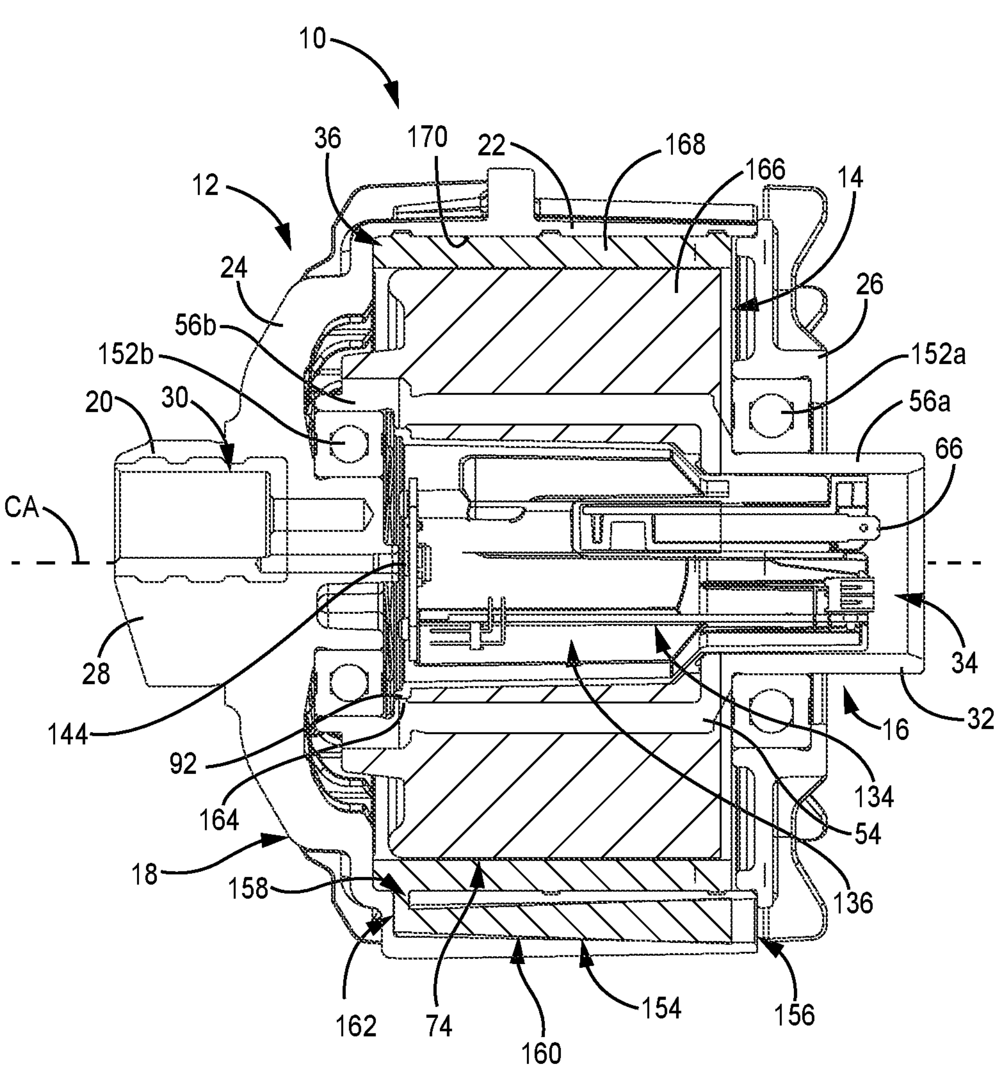
FIG. 7 is a cross-sectional view of a motor.

FIG. 7 is a cross-sectional view of motor 10. Motor 10 includes rotor 12, stator 14, support assembly 16, and bearings 152*a*, 152*b*. Rotor 12 includes rotor body 18 and eccentric output 20. Rotor body 18 includes rotor housing 22, first wall 24, second wall 26, and rotor fill channel 154. Rotor fill channel 154 extends between inlet port 156 and outlet port 158 and includes transfer channel 160 and output channel 162. Eccentric output 20 includes cylindrical projection 28 and mount bore 30. Axle 32 and stator bar 34 of support assembly 16 are shown. Axle 32 includes axle body 54, axle ends 56*a*, 56*b*, and ridge 164. End terminals 66, mount rim 92, cavity 136, board assembly 134, and connector 142 of stator bar 34 are shown.

Rotor 12 is disposed around stator 14. Air gap 74 is formed between rotor 12 and stator 14. In the example shown, stator potting 166 is shown as having a diagonal hatch in a first orientation and rotor potting 168 is shown as having a diagonal hatch in a second orientation. The stator 14 is potted with potting material separately from the rotor 12 being potted with potting material. Potting material can be epoxy, for example. The potting compound can be poured as a liquid to flow and form a matrix around most or all elements of the motor 10, and then can harden to permanently bind the motor components together. Stator potting 166 is separate from rotor potting 168. Stator potting 166 binds components of stator together. Rotor potting 168 binds components of rotor 12 together.

FIG. 7 shows stator bar 34 disposed within stator 14. More specifically, the stator bar 34 becomes integral with stator 14 during the potting process for stator 14. Stator potting 166 can extend radially from the radially outer edge of the stator bar 34 to the air gap 74 between stator 14 and rotor 12. The stator potting 166 can extend through windows 60 (best seen in FIG. 4A) in the axle 32, as shown. As such, the stator potting 166 can be disposed both radially within axle 32 and radially outside of axle 32. The stator potting 166 adheres to the exterior of stator bar 34 and to axle 32 such that the stator potting 166 fixes stator bar 34 relative to axle 32.

Stator potting 166 can embed the stator components previously shown, such as the phase assemblies 38 (best seen in FIG. 2B), and may cover the teeth 50 (best seen in FIG. 2A) or may embed the teeth 50 but leave the faces of the teeth 50 exposed. As such, the air gap 74 can be at least partially defined by the stator potting 166. In examples in which the faces of teeth 50 are exposed, the stator potting 166 can partially define one radial side of the air gap 74 (the inner radial side in the example shown) and the teeth 50 can partially define that one radial side of the air gap 74.

In some examples, stator potting 166 can extend to the interior of stator bar 34 to at least partially embed the board assembly 134. It is understood that, in other examples, the stator potting 166 does not penetrate into the interior of stator bar 34. As such, board assembly 134 may not be embedded within potting compound. Not allowing the potting compound to penetrate into the cavity 136 of stator bar 34 allows the board assembly 134 to be exposed to air for cooling instead of insulated within the stator potting 166.

Stator potting 166 can extend axially from the mount rim 92. In some examples, the stator potting 166 extends axially between mount rim 92 and axle end 56*a*. Stator potting 166 is disposed axially between bearings 152*a*, 152*b*.

Stator bar 34 interfaces with the axle 32 to form a potting seal that limits the flow of potting compound within stator 14. In the example shown, mount rim 92 interfaces with axle 32 to form the potting seal. Mount rim 92 and axle 32 can form an annular interface that seals and stops liquid potting compound from moving axially past the annular interface. More specifically, the mount rim 92 interfaces with inner ridge 164 of the axle 32 to form the potting seal. The ridge 164 projects radially inward. The ridge 164 can be formed at an interface between axle body 54 and axle end 56*b*. The ridge 164 is a projection that extends annularly about the common axis CA and radially inward towards the common axis CA.

Similar to potting material embedding components of stator 14, potting material can embed components of rotor 12. In particular, the rotor potting 168 can embed the magnets 76 (best seen in FIG. 3B) and concentrators (best seen in FIG. 3B) of the rotor 12. In some examples, the potting compound can adhere the permanent magnet array 36 to the rotor housing 22. Rotor potting 168 extends radially from the air gap 74 to the inner radial edge of rotor housing 22. As discussed in more detail below, the rotor potting 168 can extend radially beyond the inner radial edge of rotor housing 22 in at least one area of rotor housing 22. Specifically, the rotor potting 168 can extend into rotor fill channel 154. Rotor potting 168 can extend axially from one axial inner edge in the rotor housing 22 to another axial inner edge in the rotor housing 22. For example, the rotor potting 168 can extend between first wall 24 and second wall 26 of rotor housing 22. The rotor potting 168 does not extend radially inward of the air gap 74.

Rotor fill channel 154 is formed within rotor body 18. In the example shown, rotor fill channel 154 extends through the rotor housing 22. Rotor fill channel 154 includes inlet port 156 that is configured to receive the liquid potting compound. Inlet port 156 can also be referred to as a fill port or receiving port. Rotor fill channel 154 extends to outlet port 158 that is configured to output the liquid potting compound into cylindrical interior 170. Outlet port 158 can also be referred to as a discharge port. Transfer channel 160 extends from inlet port 156 and is configured to route the liquid potting compound within rotor housing 22. Transfer channel 160 extends axially. Output channel 162 extends from transfer channel 160. Output channel 162 extends between transfer channel 160 and outlet port 158. Output channel 162 extends radially to route the liquid potting compound into the cylindrical interior 170.

Rotor fill channel 154 is in fluid communication with the cylindrical interior 170 of the rotor housing 22 that directly holds the magnets 76 and concentrators 78, however the rotor fill channel 154 is radially outward from the cylindrical interior 170. Rotor fill channel 154 is disposed such that a portion of the structure of rotor housing 22 is disposed radially between the permanent magnet array 36 and rotor fill channel 154. Outlet port 158 is oriented radially, in the example shown, and inlet port 156 is oriented axially, in the example shown. During potting of rotor 12, the liquid potting compound is poured into rotor fill channel 154 through inlet port 156, flows through rotor fill channel 154, and flows into the cylindrical interior 170 through outlet port 158, as discussed in more detail below.

Figure 8A:
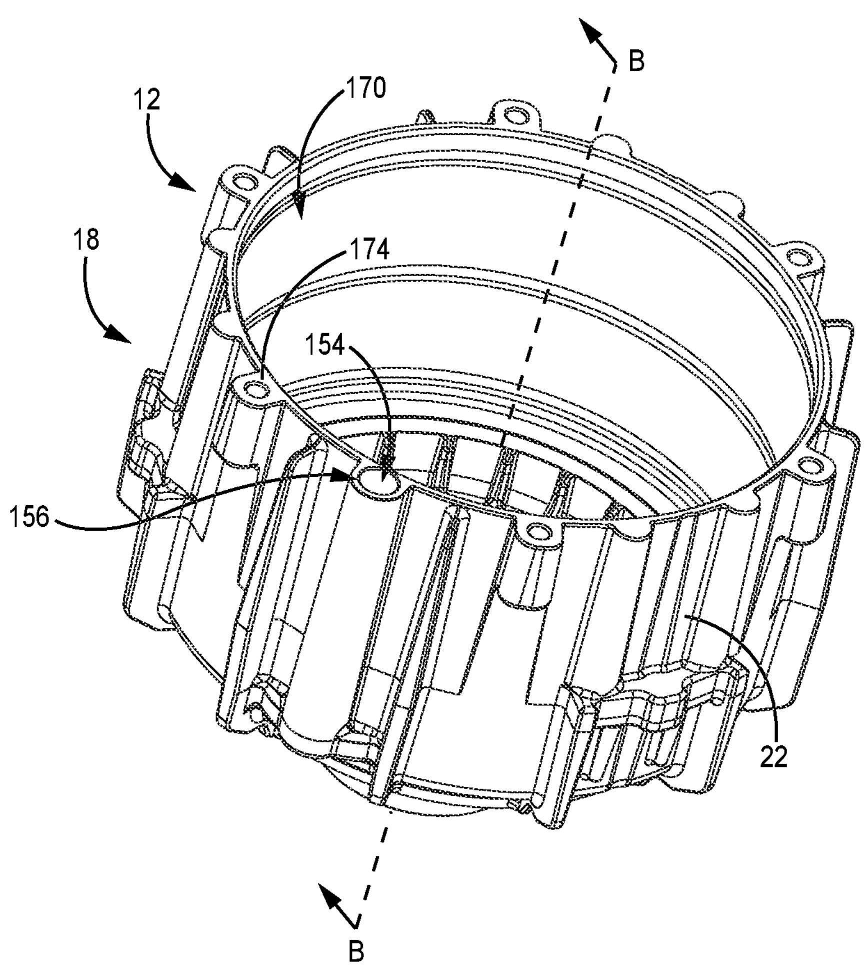
FIG. 8A is an isometric view of a housing of a rotor.
Figure 8B:
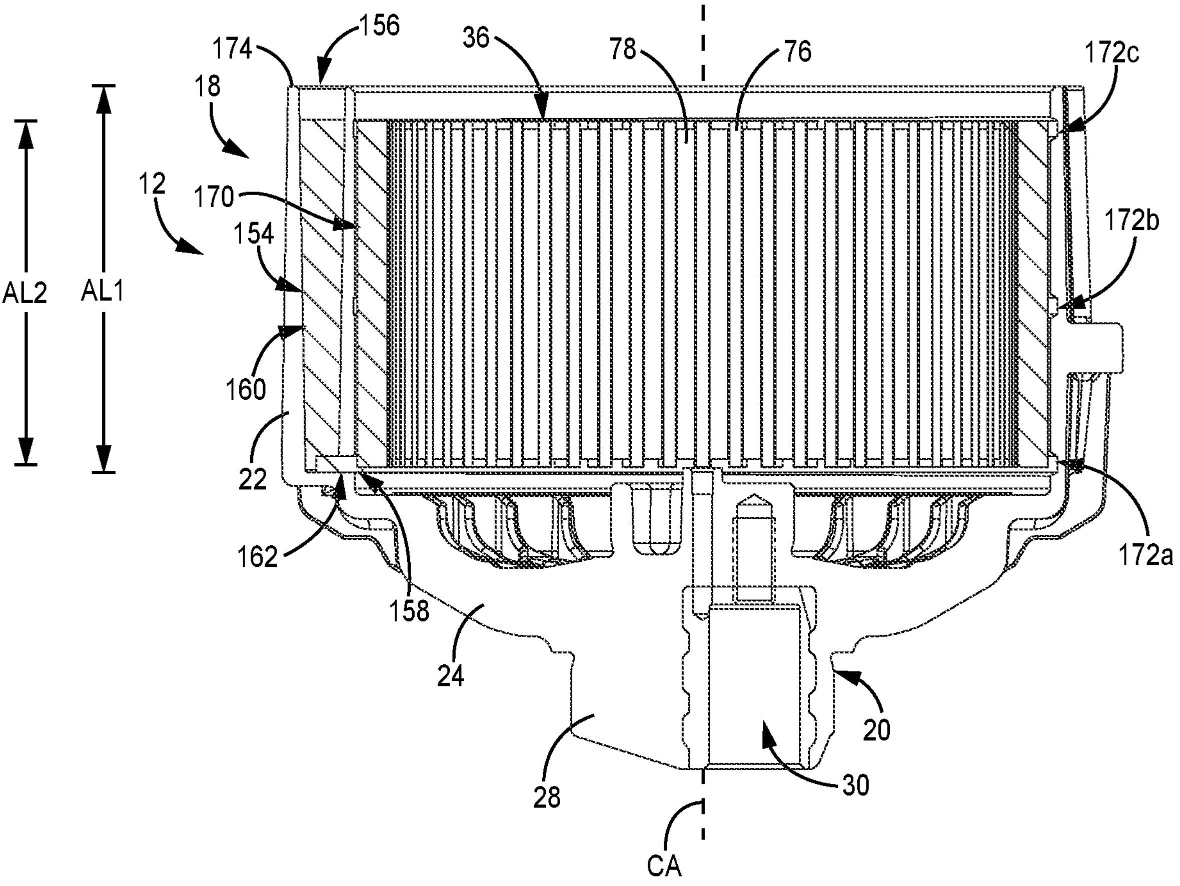
FIG. 8B is a cross-sectional view taken along line B-B in FIG. 8A.

FIG. 8A is an isometric view of rotor body 18. FIG. 8B is a cross-sectional view taken along line B-B in FIG. 8A. FIGS. 8A and 8B will be discussed together. The electromagnetic components of rotor 12 are not shown in the views of FIG. 8A to more clearly illustrate annular grooves 172*a*-172*c* within rotor housing 22. Rotor housing 22 and first wall 24 of rotor body 18 are shown. Rotor housing 22 includes annular rim 174. Rotor housing 22 further includes rotor fill channel 154, which extends between inlet port 156 and outlet port 158 and includes transfer channel 160 and output channel 162. Eccentric output 20, including cylindrical projection 28 and mount bore 30, is also shown.

Magnets 76 (FIG. 8B) and concentrators 78 (FIG. 8B) are arrayed along the cylindrical interior 170 of the rotor housing 22 and embedded in potting compound. The potting compound can penetrate into the annular grooves 172*a*-172*c* that extend annularly along the interior surface of rotor housing 22 to provide grip surfaces into which the potting compound extends and which prevents relative rotation between the potting compound and the rotor housing 22.

As shown, the annular grooves 172*a*-172*c* are asymmetric in that they are shallower on one radial side of the rotor housing 22 and deeper on another radial side of the rotor housing 22. This asymmetry prevents the block of potting compound, once solidified, from rotating within the cylindrical interior 170 of the rotor housing 22 during rotation of the rotor 12. More specifically, the solidified potting compound in the deeper part of the annular grooves 172*a*-172*c* cannot move into the shallower parts of the annular grooves 172*a*-172*c*, thus preventing rotation of the block of potting compound relative to the rotor housing 22. While asymmetric annular grooves are shown in this embodiment, different void features can be present within the cylindrical interior 170 of the rotor housing 22 into which potting compound can penetrate to grip the block of potting compound within the cylindrical interior 170 to the rotor housing 22 upon solidification of the potting compound (e.g., discrete indents, textured groove, etc.).

First wall 24 is disposed at one axial end of rotor body 18. In the example shown, first wall 24 is integrally formed with rotor housing 22 to form a monolithic structure. Eccentric output 20 extends axially from first wall 24. Cylindrical projection 28 of eccentric output 20 is formed integrally with first wall 24 in the example shown. Mount bore 30 extends into cylindrical projection 28. Mount bore 30 is configured to receive a connector, which can be formed at least in part from metal. For example, the connector can include a metallic bolt that threads into rotor housing 22 and can include a sleeve disposed around the metallic bolt. The connector can be configured to interface with a crank arm that converts the rotational output of the rotor 12 to linear reciprocating motion of a fluid displacer (e.g., piston or diaphragm, among other options). The eccentric axis EA is radially offset from the common axis CA, which is coaxial with the rotational axis of the rotor 12.

Annular rim 174 is disposed at an opposite axial end of rotor housing 22 from first wall 24. Annular rim 174 is configured to interface with the plate forming second wall 26 (best seen in FIG. 1A) of rotor body 18. Annular rim 174 defines an axial extent of rotor housing 22 away from first wall 24. Annular rim 174 is configured to be positioned to face vertically upwards during the potting process of rotor 12.

Inlet port 156 is disposed at an axial end of rotor housing 22. In the example shown, inlet port 156 is formed in annular rim 174. Rotor fill channel 154 is configured to be oriented vertically during the potting process of rotor 12. Rotor fill channel 154 extends axially within rotor body 18. Rotor fill channel 154 extends axially within rotor housing 22. Rotor fill channel 154 includes transfer channel 160 that extends axially from the axially oriented inlet port 156. Rotor fill channel 154 further includes output channel 162 that extends radially from the transfer channel 160 to the radially oriented outlet port 158. The outlet port 158 is oriented radially and open to rotor interior 170.

Rotor fill channel 154 is disposed such that a portion of the rotor body 18 is disposed radially between rotor fill channel 154 and rotor interior 170. The portion of rotor body 18 radially between rotor fill channel 154 and rotor interior 170 fluidly isolates rotor fill channel 154 from rotor interior 170 along the axial length of rotor fill channel 154 between inlet port 156 and outlet port 158. The portion of rotor body 18 radially between rotor fill channel 154 and rotor interior 170 fluidly isolates transfer channel 160 from rotor interior 170 along the axial length of transfer channel 160.

During manufacture of the rotor 12, the rotor housing 22 is orientated with the inlet port 156 oriented vertically upwards so that the cylindrical interior 170 is bowl-like. A mandrel (not shown) can be placed within the rotor housing 22, radially inward of the concentrators 78 and magnets 76 to inhibit flow of the potting compound into the interior of rotor interior 170. The mandrel can extend to the concentrators 78 and magnets 76, such as to define the air gap 74, and prevents the potting compound from fully filling within rotor housing 22. Instead, the mandrel limits the flow of potting compound to radially outward of the mandrel and radially inward of the inner radial surface of rotor housing 22. The mandrel can define the space that the stator 14 fits within when the stator 14 is assembled to rotor 12. The mandrel is removed from the rotor housing 22 after curing and solidification of the potting compound. The potting compound fills radially inward to the mandrel, such that when the mandrel is removed after the potting compound defines the outer radial side of the air gap 74.

Rotor fill channel 154 is oriented vertically during the potting process such that gravity assists in pulling potting compound through rotor fill channel 154 towards outlet port 158. Liquid potting compound is poured into rotor fill channel 154 through inlet port 156. The liquid potting compound flows downward through transfer channel 160 to output channel 162. The liquid potting compound flows radially from transfer channel 160 and through output channel 162 to outlet port 158. The outlet port 158 is oriented radially and directs the potting compound radially inward towards the permanent magnet array 36 that is formed by magnets 76 and concentrators 78 arrayed around the cylindrical rotor interior 170 of the rotor housing 22. The potting compound flows radially inward from the radial outlet port 158 and then fills axially upward towards annular rim 174. In this way, the potting compound fills vertically from bottom-to-top within the cylindrical rotor interior 170.

Outlet port 158 can be disposed proximate an axial end of the permanent magnet array 36. Outlet port 158 can thus be configured to output the liquid potting compound at the vertically lower axial end of the permanent magnet array 36. In the example shown, rotor fill channel 154 has axial length AL1 while permanent magnet array 36 has axial length AL2. The axial length AL1 of rotor fill channel 154 is greater than the axial length AL2 of permanent magnet array 36. The greater axial length of rotor fill channel 154 means that rotor fill channel 154 can receive the liquid potting compound on one axial side of the permanent magnet array 36 and output the liquid potting compound on an opposite axial side of the permanent magnet array 36.

In the example shown, the outlet port 158 partially radially overlaps with the permanent magnet array 36. A portion of outlet port 158 extends axially beyond permanent magnet array 36, such that that portion of the outlet port 158 does not radially overlap with permanent magnet array 36. Having a portion of outlet port 158 extending axially beyond, and vertically below, the permanent magnet array 36 facilitates flowing the potting compound fully annularly around rotor interior 170 to fully fill annularly within rotor housing 22. The potting compound can flow annularly around the mandrel and fills vertically upward along the permanent magnet array 36.

Flowing the potting compound into the rotor interior 170 to fill the rotor interior 170 from bottom-to-top forces air bubbles upwards and out, facilitating degassing of the potting compound. This is in contrast to pouring the potting compound directly onto the concentrators 78 and magnets 76, which risks trapping air bubbles amongst the concentrators 78 and magnets 76.

The liquid potting compound fills within rotor fill channel 154 and rotor interior 170 to form the rotor potting 168. The liquid potting compound is allowed to cure and can embed concentrators 78 and magnets 76. The cured potting compound can secure permanent magnet array 36 within rotor interior 170 and to the interior surface of rotor housing 22. The rotor potting 168 can form a continuous matrix of potting compound that extends from within rotor interior 170 to within rotor fill channel 154 and that at least partially fills rotor fill channel 154.

In addition to curing within rotor interior 170, the potting compound fill within and cures within rotor fill channel 154. The potting compound that fills within rotor interior 170 and cures within rotor interior 170 is evenly dispersed annularly around the rotor interior 170 and weight balances with itself. The rotor fill channel 154 is radially offset from the rotor interior 170. Rotor fill channel 154 being radially offset from rotor interior 170 means that any potting material that cures within rotor fill channel 154 is unbalanced from the other potting compound. The example shown does not include multiple rotor fill channels 154 disposed around rotor housing 22, though it is understood that not all examples are so limited. For example, rotor housing 22 could include another rotor fill channel 154 on an opposite radial side of rotor housing 22 from the rotor fill channel 154 shown through which potting compound can be poured or into which potting compound flows to balance with the potting compound in the rotor fill channel 154.

In the example shown, rotor fill channel 154 is disposed on an opposite radial side of common axis CA from the mount bore 30. The eccentric axis EA is disposed on an opposite radial side of common axis CA from rotor fill channel 154. A plane extending along the common axis CA and radially outward from the common axis CA can extend through both the rotor fill channel 154 and mount bore 30. The potting compound that cures within rotor fill channel 154 balances with the weight of the components mounted within mount bore 30, providing a balanced rotor 12. The potting compound within rotor fill channel 154 balancing with components in mount bore 30 facilitates efficient, balanced rotation of rotor 12 on the common axis CA, preventing undesired wear on bearings 152*a*, 152*b* and providing increased operational life. Balancing rotor 12 with the potting compound eliminates the need to add additional material to provide the rotational balance, reducing material usage and costs. In the example shown, the rotor fill channel 154 is disposed radially further outward from common axis CA than mount bore 30. The different radial distances from common axis CA facilitate the lighter weight potting compound balancing with the heavier connector components, which can be metallic, that are mounted within mount bore 30. The different radial distances from common axis CA also mean that less potting compound is needed to fill within rotor fill channel 154 to provide the rotational balance, facilitating balancing of rotor 12 while reducing the weight of rotor 12 because less potting compound is required to balance with components mounted in mount bore 30.

Figure 9:
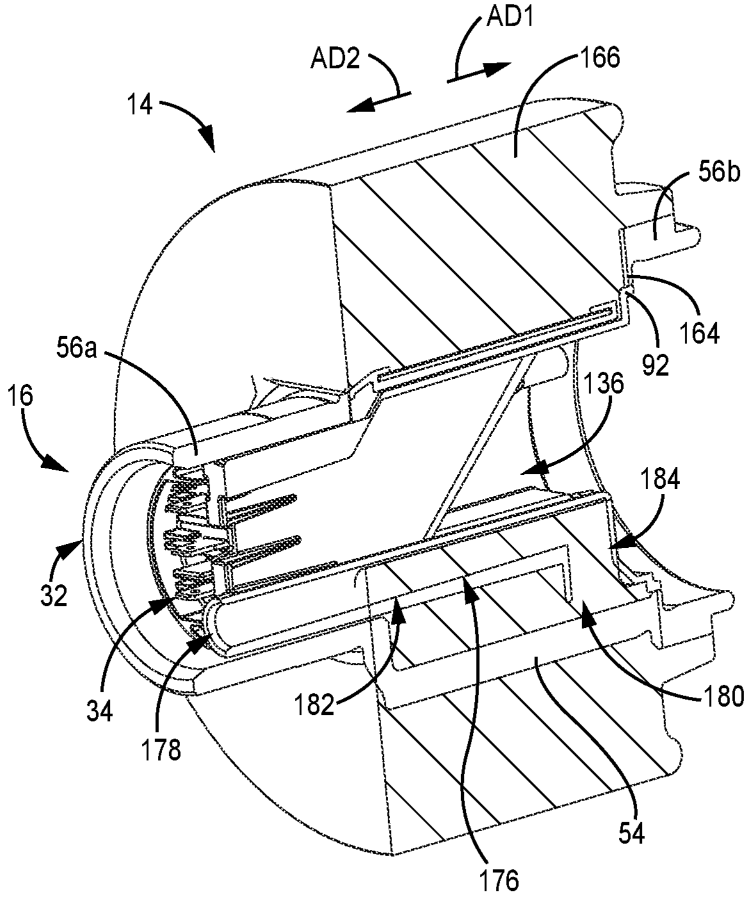
FIG. 9 is an isometric cross-sectional view of a stator.

FIG. 9 is an isometric cross-sectional view taken along line 9-9 in FIG. 1B, but with components of rotor 12 removed to show stator 14 and support assembly 16. FIG. 9 shows a simplified view of stator 14 with stator potting 166 disposed on and about support assembly 16. Axle 32 and stator bar 34 of support assembly 16 are shown. Stator bar 34 includes stator fill channel 176. Stator fill channel 176 extends between inlet port 178 and outlet port 180 and includes receiving channel 182 and discharge channel 184.

Support assembly 16 is disposed radially within stator 14. Electromagnetic components of stator 14 are disposed radially outside of support assembly 16. The electromagnetic components are at least partially disposed within the stator potting 166. Stator 14 is supported on support assembly 16. Support assembly 16 extends axially through stator 14. In the example shown, components of support assembly 16 extend fully axially through stator 14. Components of support assembly 16 extend axially beyond the stator potting 166 in both the first axial direction AD1 and the second axial direction AD2.

Axle 32 is disposed radially within stator 14. Components of stator 14 are supported on axle 32. In the example shown, axle 32 extends fully axially through stator 14 such that portions of axle 32 extend axially beyond the electromagnetic components of stator 14. Specifically, axle end 56*a* projects in second axial direction AD2 beyond the stator potting 166 and axle end 56*b* projects in first axial direction AD1 beyond the stator potting 166.

Stator bar 34 is radially within axle 32. Stator bar 34 can be considered to form a potting bar in the example shown because potting compound is flowed through stator bar 34 to pot the stator 14, as discussed in more detail below. While stator bar 34 is shown as including electrical contacts for electrically connecting stator 14 and an exterior controller, it is understood that not all examples are so limited. For example, stator bar 34 can be configured to provide the flowpath for potting compound to flow into and pot the stator 14 without including any power or data communications components. In such an example, the stator bar 34 defines an interior area within stator 14 that is not filled with potting compound, reducing weight and material use, and providing a void through which various wires can extend to form the power and data connections.

Stator fill channel 176 is formed within stator bar 34. Stator fill channel 176 includes inlet port 178 that is configured to receive the liquid potting compound. Inlet port 178 can also be referred to as a receiving port or fill port. Stator fill channel 176 extends to outlet port 180 that is configured to output the liquid potting compound into the interior of stator 14. Outlet port 180 can also be referred to as a discharge port. Receiving channel 182 extends from inlet port 178 and is configured to route the liquid potting compound within stator bar 34. Receiving channel 182 extends axially. Discharge channel 184 extends from receiving channel 182. Discharge channel 184 extends between receiving channel 182 and outlet port 180. Discharge channel 184 extends radially to route the liquid potting compound into the interior of stator 14. Discharge channel 184 is oriented radially outward in the example shown.

Stator fill channel 176 is in fluid communication with the electromagnetic components of stator 14. Stator fill channel 176 is disposed such that a portion of the structure of stator bar 34 is disposed radially between the stator potting 166 and cavity 136 within stator bar 34. Outlet port 180 is oriented radially, in the example shown, and inlet port 178 is oriented axially, in the example shown. During potting of stator 14, the liquid potting compound is poured into stator fill channel 176 through inlet port 178, flows through stator fill channel 176, and flows into stator 14 through outlet port 180, as discussed in more detail below.

As shown, mount rim 92 of stator bar 34 interfaces with ridge 164 of axle 32 to form an annular interface that seals and stops potting compound from moving axially past the annular interface therebetween. The interface between mount rim 92 and ridge 164 prevents potting compound from flowing axially through that interface and inhibits the stator potting 166 from flowing into and curing within the interior of stator bar 34.

Figure 10A:
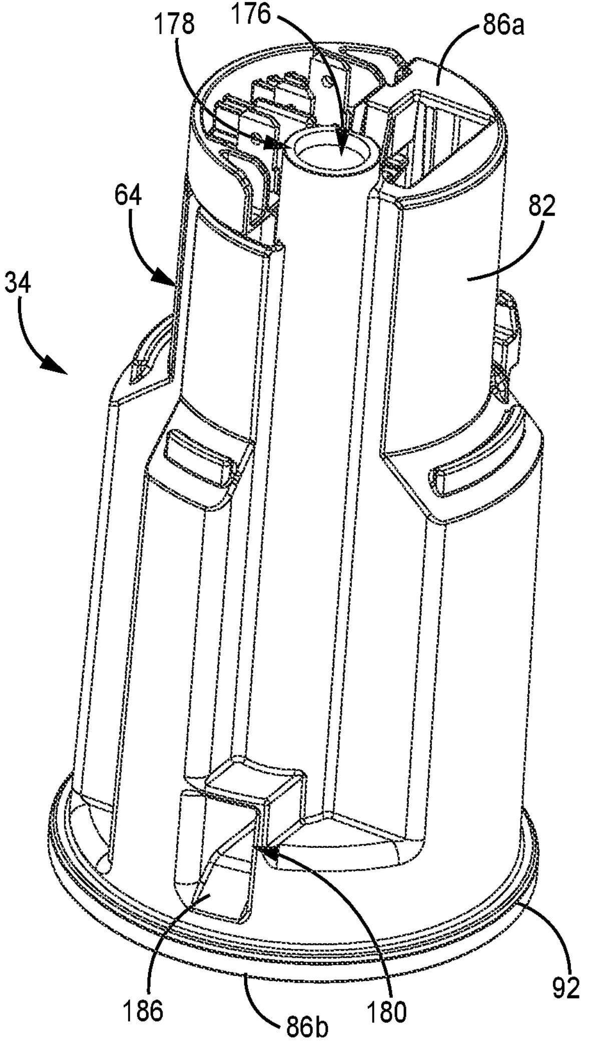
FIG. 10A is an isometric view of a stator bar.
Figure 10B:
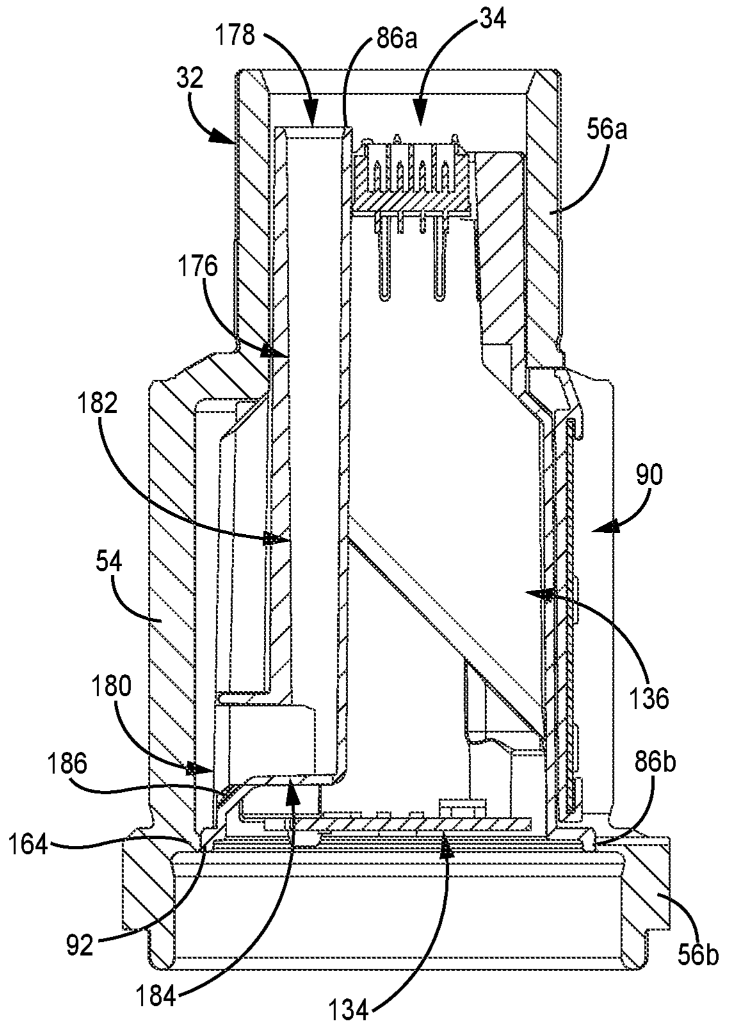
FIG. 10B is a cross-sectional view of a stator bar showing the stator bar mounted within an axle.

FIG. 10A is an isometric view of stator bar 34. FIG. 10B is a cross-sectional view of stator bar 34 taken along line 10-10 in FIG. 10A showing the stator bar 34 mounted within axle 32. FIGS. 10A and 10B will be discussed together.

Stator bar 34 includes bar body 64 extending between axial ends 86*a*, 86*b*. Stator fill channel 176 extends through bar body 64. In the example shown, stator fill channel 176 is formed within base 82 of stator bar 34. Inlet port 178 is formed at axial end 86*a* of stator bar 34. Stator fill channel 176 extends from axial end 86*a* axially through bar body 64. Specifically, receiving channel 182 of stator fill channel 176 extends axially within bar body 64 of stator bar 34. Stator fill channel 176 does not extend fully axially through stator bar 34. Instead, stator fill channel 176 extends to outlet port 180 that is spaced from axial end 86*b* and configured to output the potting material radially relative to the bar axis BA of the stator bar 34. More specifically, receiving channel 182 extends axially to discharge channel 184. Discharge channel 184 extends radially to outlet port 180.

Outlet port 180 is formed through a radial side of the bar body 64. In the example shown, outlet port 180 is formed on an opposite radial side of bar body 64 from side interface 90 on which tabs 68 and panel 70 are disposed. As discussed above, however, it is understood that not all examples of stator bar 34 include electrical or data communications connectors. In some examples, stator bar 34 is configured only as a potting bar through which potting compound flows during potting of the stator 14.

Outlet port 180 is formed with sloped outlet wall 186 in the example shown. Sloped outlet wall 186 extends axially away from the other axial wall of outlet port 180 to widen the opening of outlet port 180 relative to an internal portion of outlet port 180. The sloped outlet wall 186 extends axially towards mount rim 92. Sloped outlet wall 186 is disposed to form as a vertically lowest portion of stator fill channel 176 during the potting process. Sloped outlet wall 186 is configured such that the initial portion of the liquid potting compound flowing through stator fill channel 176 is directed along sloped outlet wall 186 and output proximate the interface between mount rim 92 and ridge 164. Sloped outlet wall 186 minimizes the axial gap between the interface between mount rim 92 and ridge 164 and outlet port 180. Minimizing that axial gap inhibits entrainment of air within the liquid potting compound as the liquid potting compound is output from stator bar 34 and into stator 14.

With stator bar 34 installed in the stator 14, inlet port 178 is oriented axially and outlet port 180 is open radially towards electromagnetic components of the stator 14. During the potting process, stator is arranged such that the bar axis BA is oriented vertically. The inlet port 178 is oriented vertically upwards. Liquid potting compound is poured into stator fill channel 176 through inlet port 178. The liquid potting compound flows vertically downward through receiving channel 182 and to discharge channel 184. Discharge channel 184 directs the liquid potting compound radially towards outlet port 180. The liquid potting compound exits stator fill channel 176 through outlet port 180 to fill amongst the electromagnetic components of stator 14. The stator fill channel 176 allows potting compound to surround the stator bar 34 but not necessarily penetrate into some components of the stator bar 34, including cavity 136, which can include circuitry components of stator 14 (e.g., board assembly 134). Isolating cavity 136 from the potting compound allows the board assembly 134 to be exposed to air for cooling instead of insulated within potting compound.

The potting compound flows out of the outlet port 180 into an area radially between stator bar 34 and axle 32. The potting compound can flow radially outside of axle 32, such as through windows 60 (best seen in FIG. 4A), to fill between the electromagnetic components of stator 14. The potting compound filling up along the sides of the stator bar 34 secures stator bar 34 to the stator 14, including solidifying the electrical connections along the tabs 68 and wire ends 52, in examples in which stator bar 34 also forms a bus bar. The cured potting compound also secures the electromagnetic components of stator 14 to axle 32. While stator bar 34 is shown as including a single outlet port 180 on the side of the stator bar 34, it is understood that stator bar 34 can include multiple side outlet ports 180 branching off from the stator fill channel 176.

Stator bar 34 forming a potting bar for potting stator 14 provides significant advantages. The liquid potting compound flows vertically downward through stator fill channel 176 prior to exiting stator bar 34. The stator bar 34 outputs the potting material at a vertically lower location along the stator 14, which inhibits the formation of gas pockets and provides for a more uniform potting. The stator bar 34 facilitates degassing as potting material is applied to the stator 14. Further, the stator bar 34 occupies space within the stator 14 and prevent potting compound from filling into that space within the interior of stator bar 34, decreasing the weight and cost of the motor. Cavity 136 being free of potting compound allows installation and servicing of electrical control components (e.g., circuit boards, wires, etc.) even after stator 14 is potted.

It is understood that electric machines and controls can be utilized in a variety of contexts and systems and are not limited to those discussed. Any one or more of the electric machines discussed can be utilized alone or in unison with one or more additional electric machines to provide mechanical output from an electric signal input for any desired purpose. Further, while electric machine 10 is generally discussed as being an electric motor, electric machine 10 can be of any desired form, such as a generator.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An electric motor comprising:

a rotor configured to rotate on an axis to generate a mechanical output, the rotor comprising a rotor body and a permanent magnet array;

a stator spaced radially relative to the rotor and disposed about the rotational axis, the stator comprising a plurality of coils spaced axially along the axis, the plurality of coils including at least three coils; and a stator bar extending along the axis, the stator bar having a first axial end and a second axial end and including a plurality of terminals forming an end interface at the first axial end, the stator bar electrically connecting the plurality of coils with the plurality of terminals;

the stator bar including a side interface electrically interfacing with each coil of the plurality of coils, the side interface between the first axial end and the second axial end.

2. The electric motor of claim 1, wherein the side interface includes a plurality of tabs and a panel, wherein each tab of the plurality of tabs is electrically connected to a first wire end of a coil of the plurality of coils and the panel is electrically connected to a second wire end of the coil of the plurality of coils.

3. The electric motor of claim 2, wherein:

each tab contacts a single coil of the plurality of coils; and the panel contacts multiple coils of the plurality of coils.

4. The electric motor of claim 2, wherein the stator bar further comprises:

a plurality of traces extending between and electrically connecting the plurality of tabs and the plurality of terminals.

5. The electric motor of claim 4, wherein the plurality of traces are disposed within a body of the stator bar.

6. The electric motor of claim 4, wherein each trace of the plurality of traces extends between a single tab of the plurality of tabs and a single terminal of the plurality of terminals.

7. The electric motor of claim 2, wherein the plurality of tabs are located on a side surface of the stator bar and are arrayed axially along the side surface.

8. The electric motor of claim 2, wherein the plurality of tabs comprises:

a first tab projecting a first distance from the side surface; and a second tabs projecting a second distance from the side surface, the second distance differing from the first distance.

9. The electric motor of claim 1, wherein the side interface is formed on a radial side of the stator bar.

10. The electric motor of claim 1, wherein the stator bar further comprises:

a base; and a hub formed separately from the base and supported by the base, wherein the plurality of terminals extend from the hub, and wherein the side interface is formed on the hub.

11. An electric motor comprising:

a rotor configured to rotate on an axis to generate a mechanical output, the rotor comprising a rotor body and a permanent magnet array;

a stator spaced radially relative to the rotor and disposed about the rotational axis, the stator comprising a plurality of coils arrayed along the axis; and a stator bar extending along the axis and including a plurality of terminals, the stator bar electrically connecting the plurality of coils with the plurality of terminals, the stator bar comprising:

a base; and a hub formed separately from the base and supported by the base, wherein the plurality of terminals extend from the hub, and wherein the side interface is formed on the hub;

wherein the hub is fixed axially relative to the base by a mounting tab formed on one of the hub and the base interfacing with a mounting slot formed on the other one of the hub and the base.

12. The electric motor of claim 10, wherein the hub is mounted in a hub receiving slot of the base, the hub receiving slot open radially and axially.

13. The electric motor of claim 1, further comprising:

a board assembly at least partially disposed within the stator bar, the board assembly comprising:

a sensor chip; and a connector having a plurality of ports.

14. The electric motor of claim 1, further comprising:

an axle disposed within the stator, wherein the stator bar is disposed within the axle.

15. An electric motor comprising:

a rotor configured to rotate on an axis to generate a mechanical output, the rotor comprising a rotor body and a permanent magnet array;

a stator spaced radially relative to the rotor and disposed about the rotational axis, the stator comprising a plurality of coils arrayed along the axis;

an axle disposed within the stator; and a stator bar extending along the axis and within the axle, the stator bar including a plurality of terminals, the stator bar electrically connecting the plurality of coils with the plurality of terminals;

wherein an axle body of the axle includes a plurality of ligaments extending axially and a plurality of windows disposed circumferentially between the plurality of ligaments, wherein the coils extend through a first window of the plurality of windows to electrically connect with the stator bar.

16. The electric motor of claim 1, wherein the stator bar further comprises:

a stator fill channel extending axially within the stator bar between an inlet port and an outlet port, the stator fill channel configured to route liquid potting compound from the inlet port to the outlet port.

17. The electric motor of claim 16, wherein the inlet port is oriented axially and the outlet port is oriented radially.

18. An electric motor comprising:

a rotor configured to rotate on an axis to generate a mechanical output, the rotor comprising a rotor body and a permanent magnet array;

a stator spaced radially relative to the rotor and disposed about the rotational axis, the stator comprising a plurality of coils arrayed along the axis; and a stator bar disposed within the axle, the stator bar including a stator fill channel extending through the stator bar between an inlet port and an outlet port;

wherein potting compound that embeds the stator at least partially fills the stator fill channel.

19. An electric motor comprising:

a rotor configured to rotate on a rotor axis to generate a mechanical output, the rotor comprising a rotor body and a permanent magnet array, wherein the rotor body comprises:

a rotor housing having a first axial end and a second axial end;

a fill port formed at the second axial end;

a rotor fill channel extending axially within the rotor housing from the fill port; and a discharge port in fluid communication with the rotor fill channel and oriented radially, the discharge port open on a surface of the rotor housing supporting the permanent magnet array; and a stator spaced radially relative to the rotor and disposed about the rotational axis.

* * * * *